(12) United States Patent
Vasdekis et al.

(10) Patent No.: US 11,726,043 B2
(45) Date of Patent: Aug. 15, 2023

(54) INTEGRATED IMAGING ASSEMBLY AND METHOD FOR USING

(71) Applicant: University of Idaho, Moscow, ID (US)

(72) Inventors: Andreas E. Vasdekis, Moscow, ID (US); Nava Subedi, Moscow, ID (US); Shahla Nemati, Moscow, ID (US)

(73) Assignee: University of Idaho, Moscow, ID (US)

( * ) Notice: Subject to any disclaimer, the term of this patent is extended or adjusted under 35 U.S.C. 154(b) by 140 days.

(21) Appl. No.: 17/199,934

(22) Filed: Mar. 12, 2021

(65) Prior Publication Data

US 2021/0285883 A1    Sep. 16, 2021

Related U.S. Application Data

(60) Provisional application No. 62/989,322, filed on Mar. 13, 2020.

(51) Int. Cl.

| G01N 21/64 | (2006.01) |
| G02B 21/00 | (2006.01) |
| G02B 21/02 | (2006.01) |
| G02B 21/26 | (2006.01) |
| H04N 23/56 | (2023.01) |
| H04N 23/90 | (2023.01) |

(52) U.S. Cl.
CPC ..... *G01N 21/6486* (2013.01); *G01N 21/6458* (2013.01); *G02B 21/008* (2013.01); *G02B 21/0048* (2013.01); *G02B 21/0056* (2013.01); *G02B 21/0064* (2013.01); *G02B 21/0076* (2013.01); *G02B 21/0088* (2013.01); *G02B 21/025* (2013.01); *G02B 21/26* (2013.01); *H04N 23/56* (2023.01); *H04N 23/90* (2023.01); *G01N 2021/6471* (2013.01); *G01N 2201/0675* (2013.01)

(58) Field of Classification Search
None
See application file for complete search history.

(56) References Cited

U.S. PATENT DOCUMENTS

| 2011/0177586 A1* | 7/2011 | Ismagilov | C30B 29/58 422/68.1 |
| 2017/0276951 A1* | 9/2017 | Kumkar | B23K 26/066 |
| 2019/0212536 A1* | 7/2019 | Fahrbach | G02B 21/0076 |
| 2019/0391382 A1* | 12/2019 | Chung | G02B 21/367 |

* cited by examiner

*Primary Examiner* — Christopher Braniff
(74) *Attorney, Agent, or Firm* — Klarquist Sparkman, LLP

(57) ABSTRACT

Certain disclosed embodiments concern an integrated imaging system that combined light-sheet microscopy, which enables considerable speed and phototoxicity gains, with quantitative-phase imaging. A method for using such imaging systems also is disclosed. In an exemplary embodiment, an integrated imaging system was used for multivariate investigation of live-cells in microfluidics.

27 Claims, 19 Drawing Sheets

INTEGRATED IMAGING ASSEMBLY AND METHOD FOR USING

CROSS REFERENCE TO RELATED APPLICATION

The present application claims the benefit of the earlier filing date of U.S. provisional application No. 62/989,322, filed on Mar. 13, 2020, the entire contents of which are incorporated herein by reference.

ACKNOWLEDGMENT OF GOVERNMENT SUPPORT

This invention was made with government support under contract No. DE-SC0019249 awarded by the United States Department of Energy. The United States government has certain rights in the invention.

FIELD

The present disclosure concerns an integrated imaging system comprising, for example, light-sheet microscopy and quantitative-phase imaging, and imaging applications thereof, including imaging applications for biology, biotechnology and chemistry.

BACKGROUND

Quantitative-phase imaging (QPI) has attracted substantial attention in recent years as a non-phototoxic method to recognize single-cells and their organelles in a label-free fashion, either innate via refractive index variations or by deep learning. Further, QPI uniquely quantifies cellular and organelle dry-density, providing more insight into cellular physiology than volumetric microscopy provides. Despite its substantial success in bioimaging, QPI lacks the specificity to quantify or localize molecular entities within a cell. As such, QPI cannot harness the immense capabilities enabled by existing fluorescence labeling techniques, such as provided by gene-encoded fluorescent reporter libraries. Epifluorescent imaging has been previously integrated with QPI; however, this imaging modality illuminates sample sections that are greater than the imaging plane, which unnecessarily increases the energy load applied to the sample. As a result, the innate non-phototoxic nature of QPI has not yet been leveraged by existing integrated fluorescent imaging schemes.

Selective plane illumination microscopy (SPIM) and light-sheet imaging (LSI), including the use of optical lattices or quasi-lattices (LLSI), have enabled substantial gains against photobleaching and toxicity in optically sectioning cellular or multicellular specimens. Conversely, quantitative-phase imaging (QPI) retains low phototoxicity and confers label-free recognition and number-density quantification of single cells and their organelles. These two imaging modalities offer complementary advantages. On the one hand, LSI (or LLSI) registers the 4D dynamics of fluorescent proteins with high spatiotemporal resolution and minimal physiology perturbation; QPI, on the other hand, unravels the number-density of cells (and their organelles) that is enthalpically more representative of metabolism than size, as determined by conventional, volumetric microscopy. Further, QPI's capability of label-free organelle recognition (e.g., nuclei, mitochondria, lipid droplets) via innate refractive index variations or deep learning offers two additional advantages. First, it improves wavelength-multiplexing by freeing spectral channels that would otherwise be occupied by fluorescent reporters targeting specific organelles. Second, it can potentially improve the precision of organelle localization, given that gene-encoded fluorescent reporters can display binding bistability between organelles, such as Glycerol-3-phosphate acyltransferase 4 (GPAT4) decorating both the endoplasmic reticulum and lipid droplets (LDs). Wilfling, F., et al., Triacylglycerol synthesis enzymes mediate lipid droplet growth by relocalizing from the ER to lipid droplets. Developmental cell, 2013. 24(4): p. 384-399.].

Integrating QPI with LSI (or LLSI) requires configurations that: (a) are compatible with conventional sample mounting techniques; and (b) do not disrupt image acquisition in either modality. While QPI is compatible with most sample mounting techniques and microfluidics, LSI and LLSI generally require practices that are atypical to common cell culture techniques (e.g., cells embedded in agarose tubes) or prone to contamination (e.g., objectives dipped into the sample chamber). Regarding undisrupted image acquisition, this is particularly pertinent to QPI since it relies on the interference between the transmitted field through the cell (signal) and a reference field [Park, Y., C. Depeursinge, and G. Popescu, Quantitative phase imaging in biomedicine. Nature Photonics, 2018. 12(10): p. 578-589]. Any photon losses or spatial frequency limitations to both fields would be detrimental to the fidelity and resolution of the reconstructed image.

Undisrupted QPI is challenging in most LSI (or LLSI) configurations utilizing two orthogonal objectives in close proximity due to the resulting obstructions in the signal or reference paths. Single-objective configurations can potentially alleviate any spatial frequency or energy losses and enable compatibility with common sample-mounting techniques. To this end, several single-objective configurations have been recently reported, with some enabling extremely large fields-of-view (FOVs); however, approaches that enable submicron (planar/axial) resolution, such as epi-illumination SPIM or highly inclined and laminated optical sheet (HILO), typically achieve only a fraction of the field-of-view (FOV) endowed by QPI. For example, a reported FOV with an illumination beam of a 70-µm, diffraction-free propagation length was approximately 5× less than what would be possible with QPI. Yang, B., et al., Epi-illumination SPIM for volumetric imaging with high spatial-temporal resolution. Nature Methods, 2019. 16(6): p. 501-504. Inevitably, this FOV discrepancy at submicron resolution levels can yield significant differences between the throughput rates of QPI and LSI (or LLSI), which can be detrimental to statistically significant investigations.

Despite major recent advances in QPI and LSI (or LLSI), these two modalities rely on disparate hardware configurations and sample-mounting techniques. These limitations hinder integrated QPI and LSI imaging and, thus, key live-cell imaging investigations at the single-cell level. One such example pertains to delineating the stochastic effects in gene and metabolic networks [Kiviet, D. J., et al., Stochasticity of metabolism and growth at the single-cell level. Nature, 2014. 514(7522): p. 376-9], where the former can be deciphered by gene-encoded fluorescent markers and the latter precisely quantified by QPI.

SUMMARY

One disclosed embodiment concerns an imaging system comprising an integrated quantitative-phase imaging system and a light-sheet imaging system. The integrated imaging system can be used to image the same target with identical FOVs. Further, this integrated imaging system exhibits no disruptions to the image acquisition process of either imaging modality, compatibility with conventional sample mounting techniques and microfluidics, and further is supported by open access software for image acquisition and processing.

The system may include a first detection objective for quantitative-phase imaging (QPI) and a second objective for guiding light-sheet illumination, including non-diffracting beams. Any suitable diffraction-free beam may be used, such as an Airy beam, a Bessel beam, an optical lattice or a gaussian beam, and such beams may be generated by a spatial light modulator (SLM) or a diffractive optical element. The first and second objectives are configured so that illumination and detection are arranged orthogonally. The imaging system also may include a device for viewing, generating and/or capturing an image, such as a camera. In a particular embodiment, the imaging system is configured to combine spatial light interference microscopy (SLIM) for QPI with an Airy beam light-sheet for 3D fluorescent imaging using a standard inverted microscope.

A person of ordinary skill in the art will appreciate that the disclosed imaging system may include other components and features that facilitate operation. For example, a disclosed imaging system included a second SLM to reconstruct an optical-phase image in a SLIM modality. As another example, the system may further comprise a reflecting dichroic filter to direct a fluorescent signal to a camera and an interferometric signal to the same or a different camera.

Certain disclosed embodiments are configured for integration with a standard, commercially-available microscope that provides the first and/or second objectives. To facilitate operation, the microscope in an exemplary embodiment was coupled to a microscope stage configured to position a sample for scanning in 3 directions, wherein the microscope stage included a piezo stage integrated with two linear stages. This exemplary system further comprised a MEMS mirror for directing an illumination beam to the sample. The piezo stage, linear stages and MEMS mirror were synchronized using a controller to provide 3-dimensional imaging by scanning vertically using the piezo stage and scanning an illumination beam planarly using the MEMS mirror.

As another feature of disclosed embodiments, the imaging system may be used in combination with a microfluidic system, such as a microfluidic receiver for housing a sample. The microfluidic system may be advantageously manufactured using a material or materials having a refractive index or indices substantially matching the refractive index of a sample medium, such as an aqueous medium. The disclosed imaging system is particularly suitable for biological or chemical applications. Accordingly, the sample may comprise, for example, cells and/or tissue. For these applications, one disclosed embodiment of a microfluidic sample receiver was made using a material having a refractive index of about 1.3 using a MY POLYMER material, agarose, polyacrylamide, or combinations thereof.

A more specific embodiment of a disclosed imaging system comprised a first detection objective having different selectable levels of magnification from 1× to 100× for QPI, and a second objective having different levels of magnification from 1× to 100× for guiding an Airy beam, Bessel beam, optical lattice, or Gaussian beam generated by a first spatial light modulator (SLM) to illuminate a sample housed in a microfluidic sample receiver with an illumination beam. The first and second objectives were configured so that illumination and detection were arranged orthogonally. The imaging system further comprised a condenser to guide white or monochromatic illumination to the sample, a light conduit arranged parallel to the detection objective, and a second SLM to reconstruct an optical-phase image, as needed. A reflecting dichroic filter directed a fluorescent signal to a first camera and transmitted white light to the second SLM and a second camera.

The present invention also provides embodiments of a method for using disclosed embodiments of an integrated imaging system. Certain particular applications include using the system for imaging a biological system, such as imaging a cell, imaging an organelle, imaging an organ, or imaging an organism. The imaging system may be used, for example, to image a live cell sample where QPI provides label-free information concerning location, size and dry-density of cells and organelles, and Airy LSI provides information such as three- or four-dimensional protein dynamics. There are, of course, numerous other applications for the disclosed imaging system, such as imaging a chemical reaction medium or constituents thereof.

The foregoing and other objects, features, and advantages of the invention will become more apparent from the following detailed description, which proceeds with reference to the accompanying figures.

DETAILED DESCRIPTION

I. Terms, Definitions and Abbreviations

Figure 1:
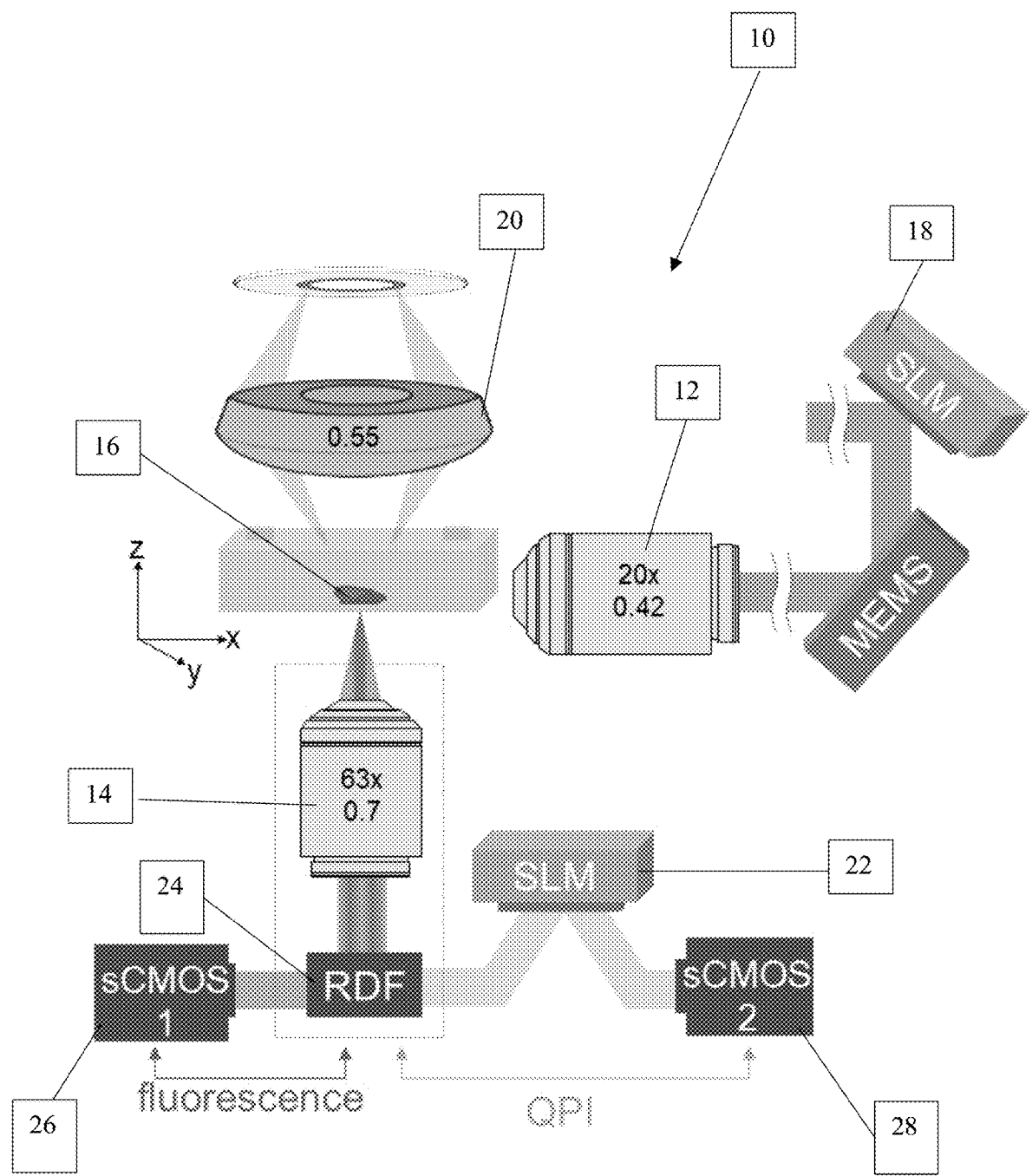
FIG. 1 is a schematic drawing illustrating an exemplary embodiment of an imaging system according to the present invention comprising two objectives arranged orthogonally, one for detection (e.g. 63×/0.7) and one (e.g. 20×/0.42) for guiding an Airy beam generated by a spatial light modulator (SLM) and scanned in the y direction to a sample enclosed in a microfluidic system, and an 0.55-NA condenser to guide the white illumination to the sample, wherein the transmission is encoded by a second SLM to reconstruct the optical-phase image, and wherein RDF stands for "reflecting dichroic filter," which directs the fluorescent signal to sCMOS1 and the transmitted white light to a second SLM and sCMOS2.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

FOV: Field(s)-of-view.
LD/LDs: Lipid droplet or droplets.
LSI: Light-sheet imaging.
LLSI: Lattice light sheet imaging.
MEMS: Micro electrical mechanical system.
NA: Numerical aperture.
QPI: Quantitative-phase imaging.
RDF: Reflecting dichroic filter.
SLM: Spatial light modulator.
SPIM: Selective plane illumination microscopy.

II. Introduction

Single-cell biology has led to a plethora of unexpected discoveries, primarily catalyzed by advances in optical imaging, as well as sequencing and metabolomics. In the context of optical imaging, the advent of SPIM, LSI and LLSI has greatly advanced the ability to probe dynamic and structural cellular phenotypes at unprecedented imaging speeds and phototoxicity levels. QPI has low phototoxicity. QPI also provides additional information concerning the location, size and dry-density of cells and their organelles. Importantly, dry-density offers insight that is enthalpically more pertinent to cellular physiology and metabolism than what is possible by volumetric bioimaging, including LSI.

Certain disclosed embodiments of the present invention concern fusing these two imaging modalities, as exemplified by merging the two using a standard inverted microscope. For one exemplary embodiment using a self-accelerating Airy beam illumination pattern, this integrated system exhibited identical fields-of-view in each modality without any disruptions to their respective optical paths. Importantly, this design is compatible with microfluidics that alleviate some of the stringent culture and sample preparation techniques required by common LSI and LLSI configurations. Further, the described integrated design is compatible with most QPI methods, including holographic tomography and appropriate methods for thick and multiply scattering samples, open-source software, and alternative microscope frames, making it accessible to the broader scientific community, including non-specialists.

As a representative example, an integrated imaging assembly according to the present invention was used to image a microorganism, *Yarrowia lypolytica*, that is challenging to image due to its small dimensions. This imaging example revealed that clonal cells can exhibit two distinct forms of spatial heterogeneity. Specifically, enzymes participating in ergosterol biosynthesis localized heterogeneously both in the cytosolic milieu and around the LDs. Furthermore, when localized, images demonstrated that erg6 decorates LDs heterogeneously. These two forms of spatial heterogeneity suggest that ergosterol biosynthesis is likely also spatially heterogeneous. Such forms of heterogeneity not only indicate that LD recognition solely from the GFP signal of erg6 can be limiting, but also that cellular noise affecting the levels of erg6 expression may also impact the compartmental localization of metabolic reactions. This observation raised further questions about the underlying metabolic costs, efficiencies, and evolutionary consequences of metabolic compartmentalization. This live-cell imaging experiment represents one example of how the present integrated imaging system can be applied to single-cell biology investigations, whereby QPI provided information about organelle location in a label-free fashion and cell metabolism via the enthalpically relevant metric of dry-density, whereas Airy LSI provided information about 3D protein dynamics.

III. Integrated Imaging Assembly

A. Optical Setup

Embodiments of an integrated imaging system according to the present invention are illustrated in FIGS. 1-7. Integrated imaging system 10 combines spatial light interference microscopy (SLIM) for QPI with an Airy beam light-sheet for 3D fluorescent imaging on to a standard inverted microscope. FIG. 1 provides a schematic illustration of an imaging set-up 10 according to the present invention comprising two objectives 12, 14 arranged substantially orthogonally. A first objective 12 guides an Airy beam to a sample 16 enclosed in a microfluidic system. Objective 14 is a detection objective. In the illustrated embodiment, objective 12 was a 20×/0.42 objective, and detection objective 14 was a 63×/0.7 objective. The Airy beam was generated by a spatial light modulator (SLM) 18 and scanned in the y direction. SLIM operates by illuminating the sample 16 in a Koehler configuration through a high numerical aperture (NA) condenser 20. The illustrated embodiment used an 0.55 NA, 2.8 cm working distance condenser 20. Condenser 20 guides white illumination to the sample 16, and the transmission is encoded by a second SLM 22 to reconstruct the optical-phase image. The illustrated embodiment of the imaging system also included a reflecting dichroic filter (RDF) 24 to direct fluorescent signal to first camera (sCMOS) 26 and the transmitted white light to a second SLM 22 and second camera (sCMOS) 28. Sample transmission was guided via objective 14 onto a spatial light modulator 22. Spatial light modulator 22 is positioned at a conjugate image plane from a standard camera port and applies additional phase-delays to the non-diffracted wavefront (background) with respect to the diffracted wavefront. At this configuration, SLIM reconstructs quantitative-phase images of approximately 200×200 $\mu m^2$ areas and planar resolution of 0.641±0.006 $\mu m$ (mean±standard error, determined by imaging n=25 beads with a 500 nm diameter).

Figure 2:
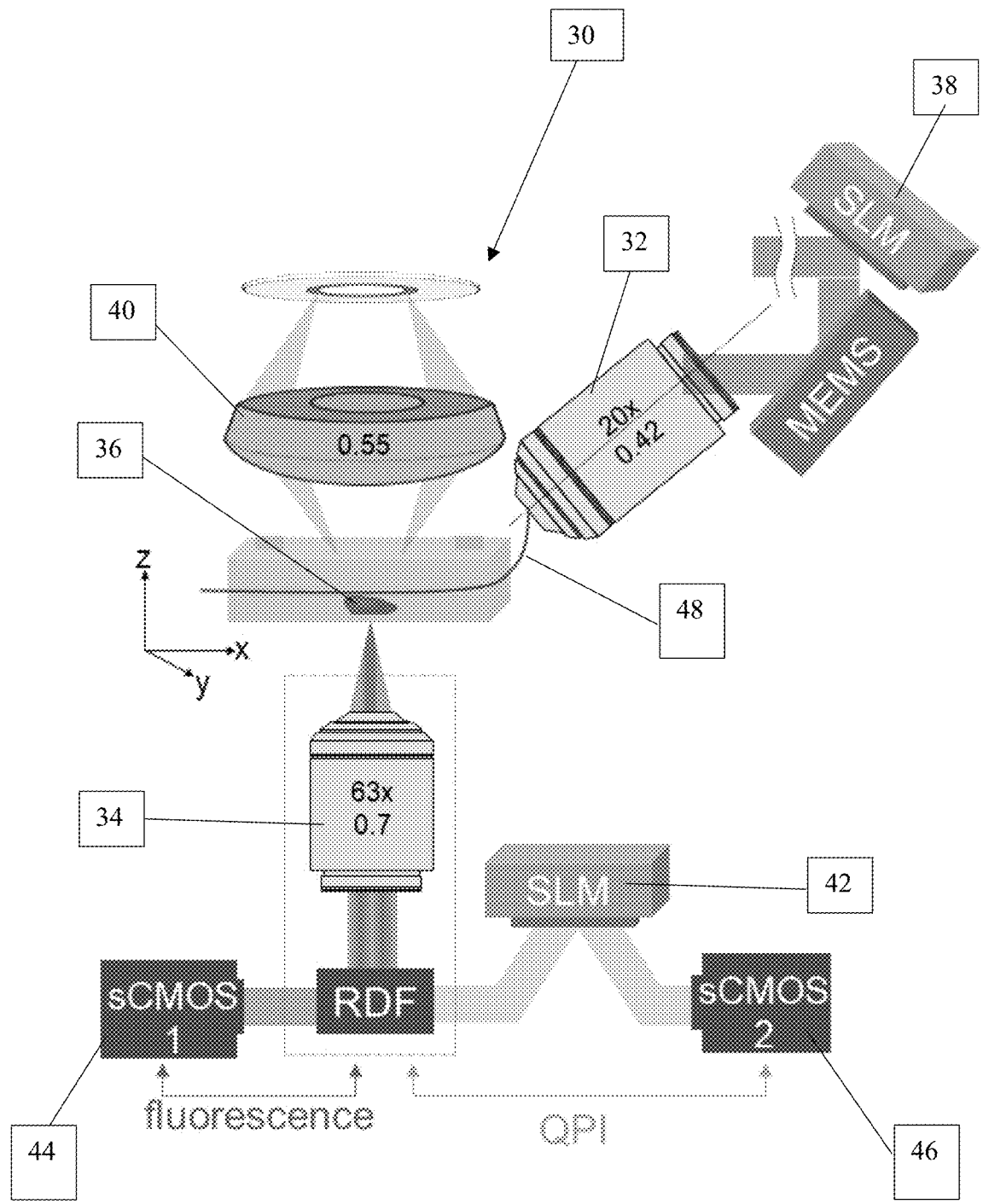
FIG. 2 is a schematic drawing illustrating an exemplary embodiment of an imaging system as illustrated by FIG. 1 according to the present invention but comprising two objectives that are not physically orthogonal, as long as the illumination path is substantially orthogonal to the detection objective.

FIG. 2 illustrates a second embodiment of a disclosed integrated imaging system 30 according to the present invention substantially as illustrated by FIG. 1 that combines spatial light interference microscopy (SLIM) for QPI with an Airy beam light-sheet for 3D fluorescent imaging using a standard inverted microscope. Imaging assembly 30 also comprises two objectives 32, 34; however, FIG. 2 illustrates that the objectives need not be arranged substantially orthogonally, as long as illumination path 48 from an illuminating beam, e.g from the Airy beam in this example, to the sample 36 is substantially orthogonal to the QPI path.

Figure 3:
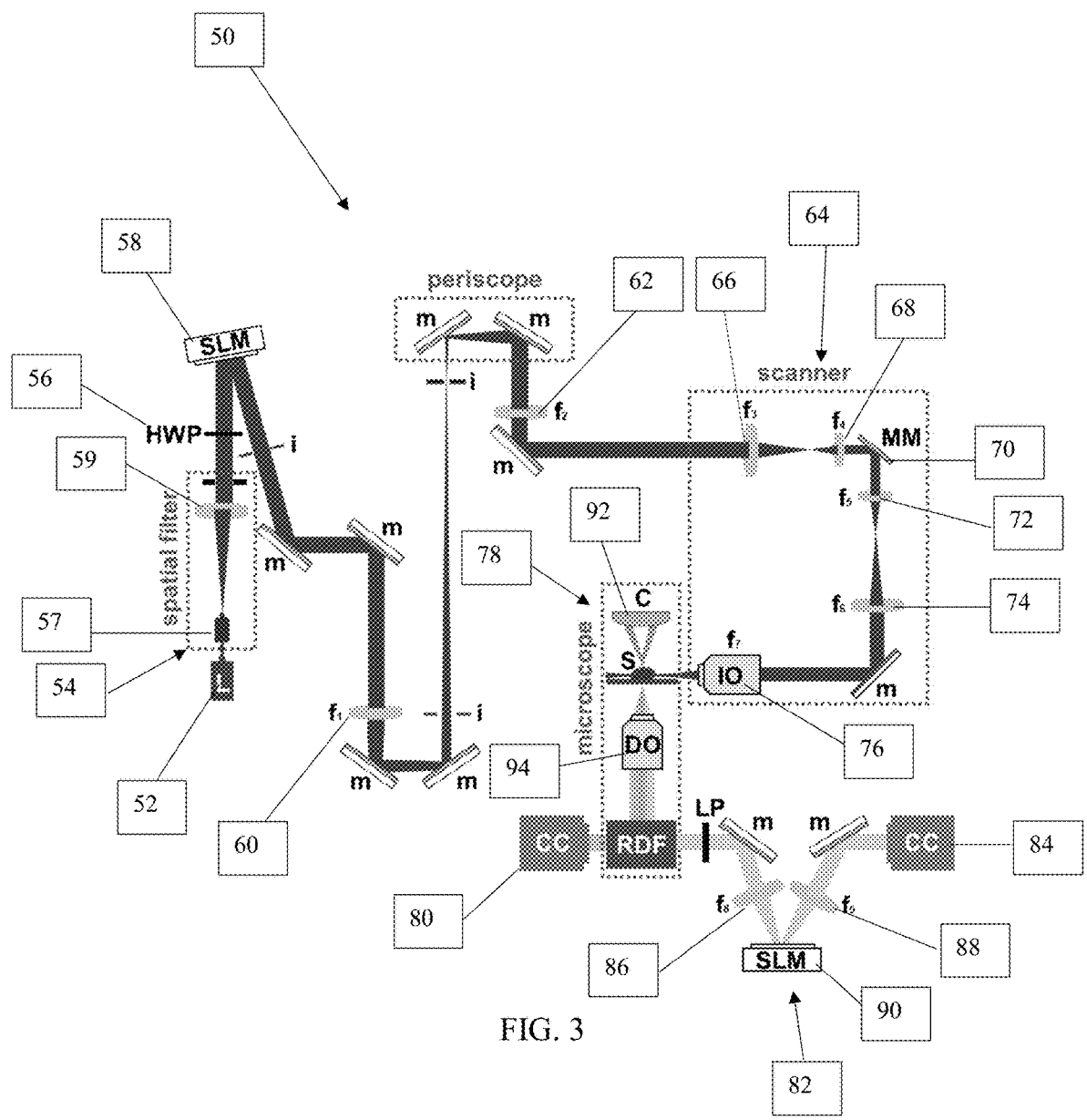
FIG. 3 is a schematic drawing illustrating an integrated imaging assembly for generating an Airy beam.

FIG. 3 provides a schematic representation of an exemplary integrated imaging assembly 50 for generating an Airy beam. Assembly 50 includes a laser source 52, such as a Spectra Physics EXLSR-488C-200-CDRH, 200 mW, 488 nm laser, suitable for fluorescence excitation. The laser beam was expanded to a 10 mm diameter using a spatial filter (910A, Newport) 54 comprising a 25 μm diameter pinhole and an objective 57 (e.g. 10×/0.25 NA, Wild Heerbrugg), and subsequently collimated with a converging lens

59 of 25 cm focal length. A half-wave plate (WPHSM05-488, Thorlabs) 56 was installed before spatial light modulator 58 (MSP 1920-400-800-HSP8, Meadowlark Optics). SLM 58 displayed a cubic phase mask that was generated in Matlab (Mathworks), with the 0 and $2\pi$ phase levels corresponding to 0 and 255 gray levels, respectively. A 4f system was installed comprising an f1 lens 60 (75.6 cm) and an f2 lens 62 (40 cm). The f1 image was conjugated to SLM 58 (i.e., the SLM was placed at the back-focal plane of f1) and f2 was conjugated to a laser scanner 64 (i.e., the laser scanner was placed at the focal plane of f2). Scanner 64 was assembled within a 30 mm cage system (not shown). Scanner 64 included a second 4f system comprising an f3 lens 66 (3.5 cm) and an f4 lens 68 (1.2 cm), a 2D micro electromechanical mirror (MEMS) (MM) 70 (2.8 mm diameter, Mirrorcle Technologies), an f5 scan lens (f5=7.5 cm) 72, an f6 tube lens 74 (30 cm), and a large working distance illumination objective 76 (20×/0.42, Mitutoyo). The long focal-length tube lens 74 was specifically employed to accommodate the distance the microscope frame extends along the y-axis (FIGS. 4-7). The scanner was positioned on a custom-made 3D stage with a 5 cm travel range in all three axes, 1 μm resolution in the vertical axis (z-axis in FIG. 1) and 10 μm planar resolution (xy plane in FIG. 1). The 3D stage enabled precise alignment of the focused Airy beam with the focal planes of the detection objective (63×/0.7, PH2, Leica) and the condenser of a standard inverted microscope (DMi8, Leica) 78. Microscope 78 was equipped with a focus stabilization system, as well as automation in the objective turret and filter wheel position. 3D fluorescent images were captured by a scientific CMOS camera (ORCA-Flash 4.0, Hamamatsu) 80 connected to one port of microscope 78 using a MicroManager ASIdiSPIM plugin.

A spatial light interference microscopy (SLIM) assembly 82 was installed on a second port of microscope 78 to relay the conjugate image plane onto a second sCMOS camera (ORCA-Flash 4.0, Hamamatsu) 84 using a 4f system comprising an f8 lens 86 and an f9 lens 88 (15 cm focal lengths for both lenses). A second SLM 90 (STD 512-450-850-ExtFlip, Meadowlark Optics) was positioned at the Fourier plane of the first f8 lens 86 of the 4f system to modulate the phase difference between the scattered and un-scattered components of light at increments of $\pi/2$, $\pi$, $3\pi/2$ and $2\pi$. Similar to conventional phase contrast microscopy, the scattered and un-scattered wavefronts were separated by applying hollow cone illumination using an illumination condenser 92 (in Koehler configuration) equipped with the appropriate annulus (PH2). Under these illumination conditions, only the scattered light deviates from the illumination cone and, thus, is projected on to a different location of the SLM. Using this approach, quantitative-phase images were acquired in an automated fashion (CellVista Pro, Phi Optics) through the same detection objective. This arrangement provides information concerning, for example, the relative phase delay of cells in a sample (scattered wavefront) with respect to the background (un-scattered wavefront). The minimum detectable phase step is less than 1 mrad with this system.

B. Optical Alignment

Irises along the optical path (FIG. 3) ensured that the excitation laser beam from laser 52 passed through the center of all optical elements, as well as enabled the selection of the first-order diffraction from SLM 58 and alignment inspection on a daily basis. Once installed, the optical system remained stable for months, requiring only minor mirror adjustments every few days. The active SLM pattern was aligned with the excitation beam using a CMOS camera (acA3800-14 um, Basler). During installation, a microscope stage and the scanner 64 were properly aligned by coupling the 488 nm beam to a single mode fiber (MBT613D, Thorlabs) and interfacing it with the scanner's cage through a fiber-port collimator (PAF2P-11E, Thorlabs). By inspecting the excitation beam profile at the image plane, any necessary adjustments in the positions of the scanner 64 and microscope 78 were made until the illumination and detection planes overlapped. Subsequently, the fiber was removed and the free-space 488 nm beam was aligned with respect to the input and output ports of the scanner 64 using an alignment target (CPA1, Thorlabs) and a CMOS camera mounted on the microscope stage (acA3800-14 um, Basler). Airy beam quality was inspected both with the stage-mounted CMOS camera, as well as the sCMOS camera connected to the microscope port. For the latter, both a custom-made 90° reflector on the microscope stage and a fluorescent polydimethylsiloxane (PDMS) sample were used.

C. Custom Microscope Stage

Figure 4:
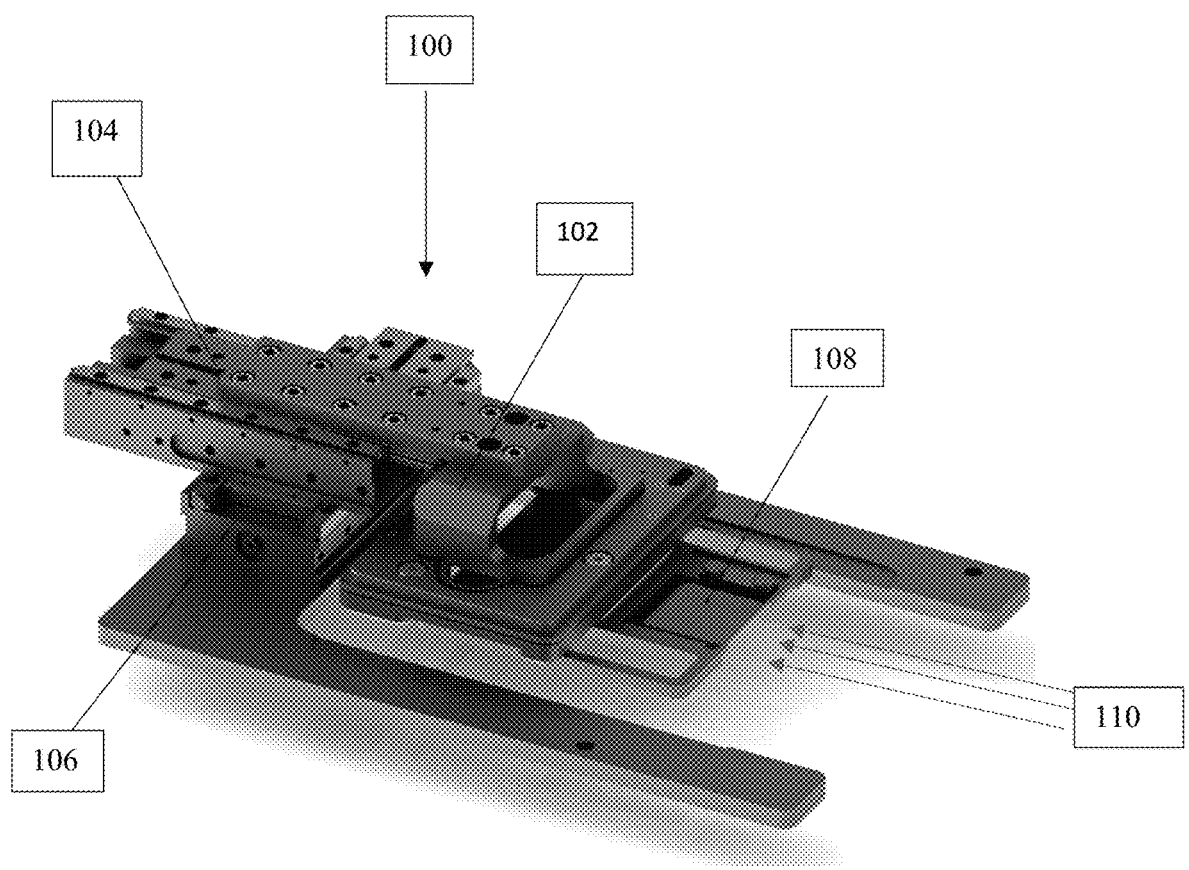
FIG. 4 illustrates a custom-built stage, compatible with a standard inverted microscope and comprising two linear stages, a piezo stage and a sample receiver that enables access and, thus, sample illumination by an accelerating beam, such as an Airy beam, in the direction denoted by the arrows.

FIG. 4 is a digital image of a custom-made microscope stage 100 that was used to position a sample and scan it in all three directions for imaging. Stage 100 comprised a piezoelectric stage 102 (IPZ-3150, Applied Scientific Instrumentation) having a 2.2 nm resolution and 150 μm total travel range. Piezo stage 102 was integrated with two linear stages (LS-50, Applied Scientific Instrumentation) 104, 106, each having a 5.5 nm encoder resolution and 50 mm total travel range. Stage 100 also included a sample receiver 108, with the illumination direction relative to the receiver being shown by arrows 110. For acquisition, the piezo stage 102, linear stages 104, 106, and 2D MEMS mirror 70 were synchronized using a controller (TG-1000-8, Applied Scientific Instrumentation) equipped with programmable logic, and communication cards. To enable 3D imaging at a single location, the sample was scanned vertically (i.e., along the z-axis in FIGS. 1 and 2) using the piezo 102, and the Airy beam planarly (i.e., along the y-axis in FIGS. 1 and 2) using the MEMS mirror 70 (FIG. 3).

Figure 5:
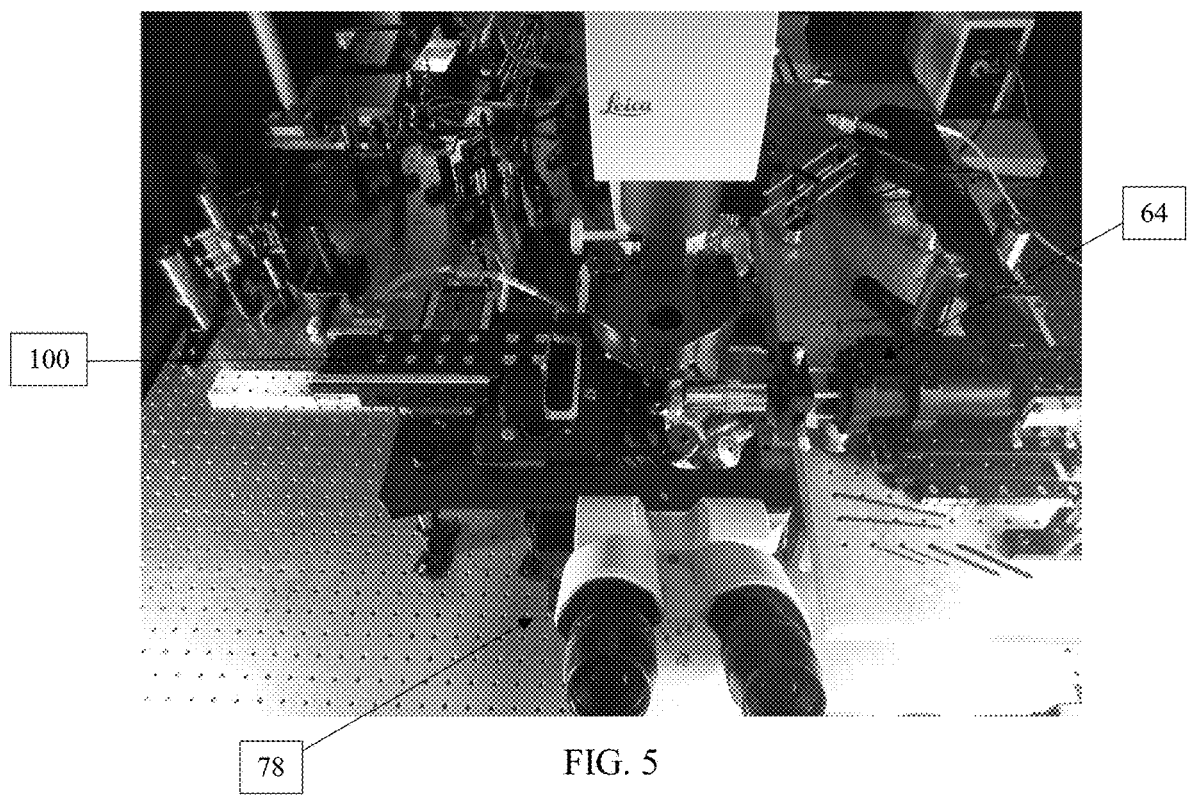
FIG. 5 is a front view of an assembly according to the present invention comprising a commercial microscope, a scanner system and the custom built stage illustrated by FIG. 4.
Figure 6:
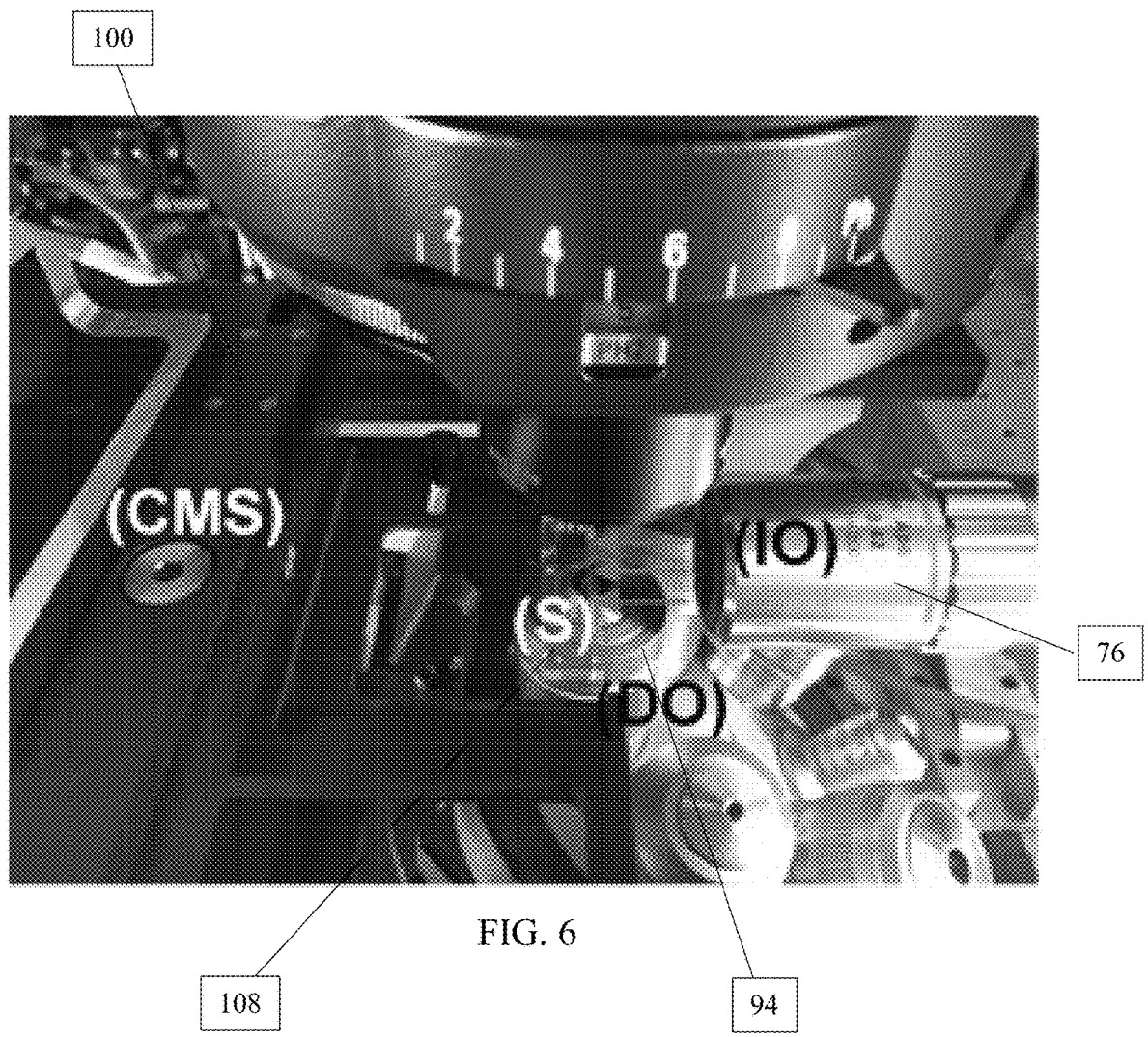
FIG. 6 is a detailed perspective view of a microscope assembly according to the present invention illustrating the illumination objective, the detection objective, the microscope stage, and sample receiver.
Figure 7:
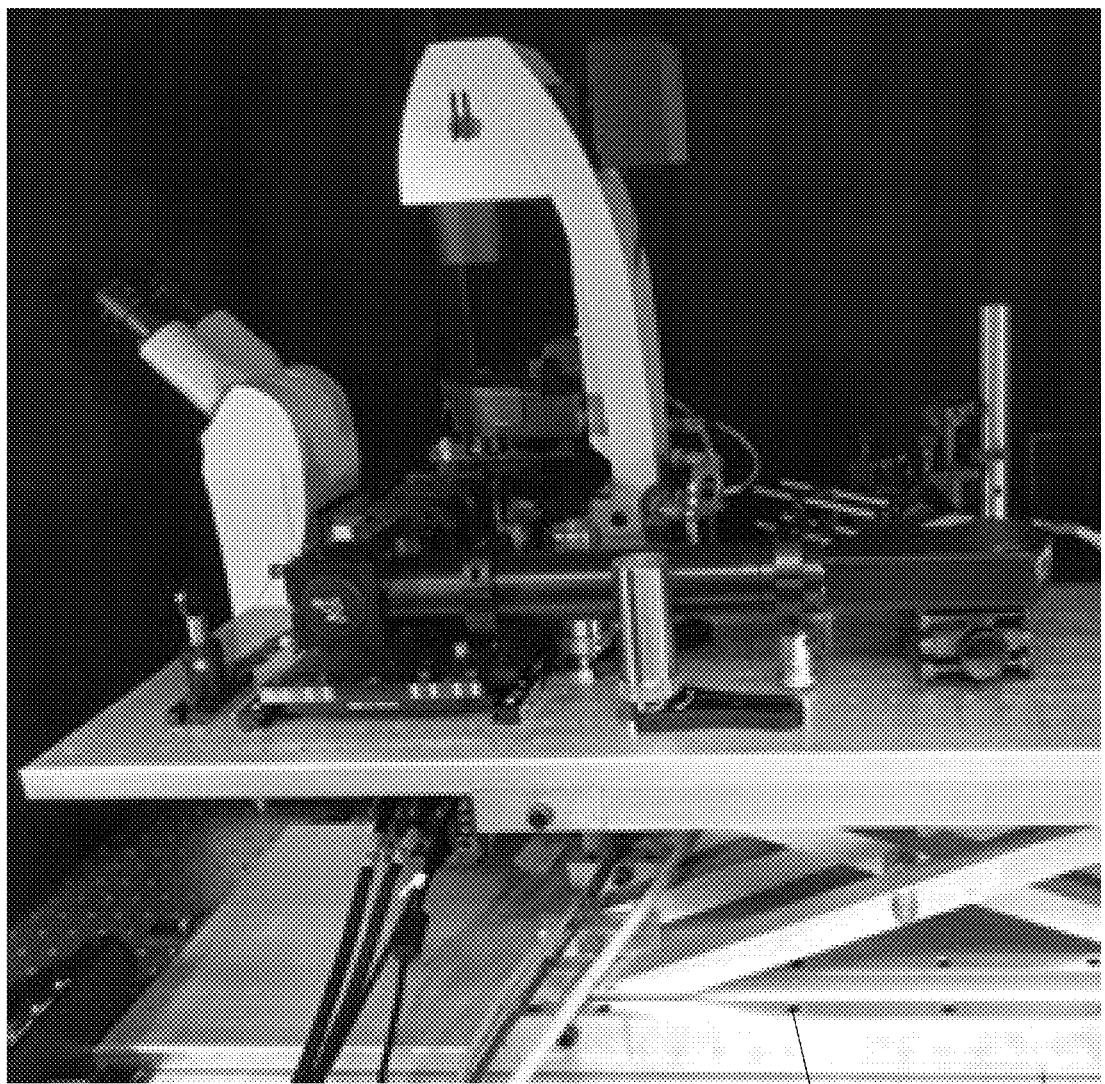
FIG. 7 is a side view of a jack and stage configured to move a beam scanner assembly and illumination objective for one embodiment of the present invention.

FIGS. 5-7 provide additional digital images of one embodiment of an integrated imaging assembly according to the present invention. FIG. 5 is a front view of an assembly according to the present invention comprising a commercial microscope 78, a scanner system 64 and the custom-built stage 100 illustrated in FIG. 4.

FIG. 6 is a detailed perspective view of a microscope assembly according to the present invention illustrating the illumination objective 76, the detection objective 94, the microscope stage 100, and a sample receiver 108.

FIG. 7 is a side view of a jack 120 configured to move a beam scanner assembly and illumination objective for one embodiment of the present invention.

Figure 8:
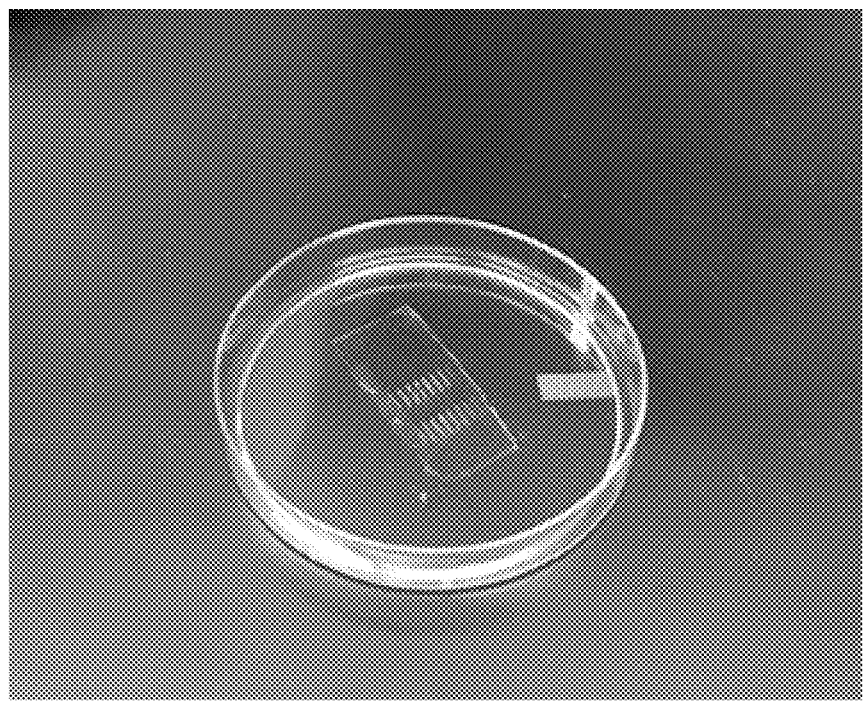
FIG. 8 is a perspective view of a polymer (MY POLYMER BIO-133-BP30) imprinted with an array of one dimensional diffractions gratings of different periods, where the gratings are visible due to the polymer's refractive index contrast with air.
Figure 9:
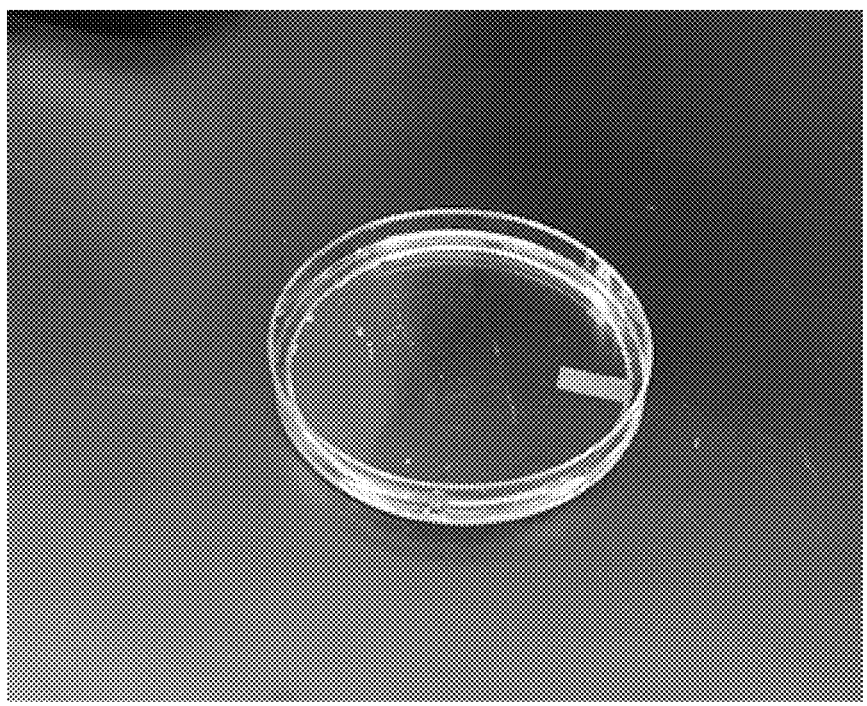
FIG. 9 is a perspective view of the same imprinted polymer illustrated by FIG. 8 immersed in water demonstrating that the polymer is no longer visible as its refractive index is substantially the same as water.

Certain disclosed embodiments of an integrated imaging system according to the present invention were configured for use in combination with a microfluidics sample receiver. For cell imaging, a polymer microfluidic system microfabricated in a polymer matrix with a refractive index matched to water was used. One embodiment of a suitable polymer is BIO-133-BP30, from My Polymers, which is a reduced-cytotoxicity, non-fluorescent, low refractive index UV curable optical polymer/coating/adhesive. BIO-133 is intended for bio-photonic and biological microscopy/imaging applications. One reason that BIO-133 is suitable is because it has an index of 1.33, which matches the index of cells and tissues, which minimizes image distortion. FIG. 8 is a perspective view of a polymer (MY polymer BIO-133-BP30) imprinted with an array of one-dimensional diffractions gratings of different periods, where the gratings are visible due to the polymer's refractive index contrast with air. FIG. 9 is a perspective view of the same imprinted polymer illustrated by FIG. 16 immersed in water demonstrating that the polymer is no longer visible as its refractive index is substantially the same as water.

The microfluidic system comprised a rectangular microcontainer defined by 800 µm thick vertical sidewalls. This microsystem was first fabricated in polydimethylsiloxane (PDMS using conventional cast-molding lithography from a patterned SU8 coated Si wafer, and subsequently transferred to BIO-133-BP30 via UV lithography in a mask-aligner (Q4000-4, Quintel Corporation). Once cells were introduced into the micro-container with a pipette, the microsystem was enclosed with a coverslip coated with a 400 µm thick film of the same polymer. Fluid exchange was possible during cell loading or alternatively via external tubes.

Figure 10:
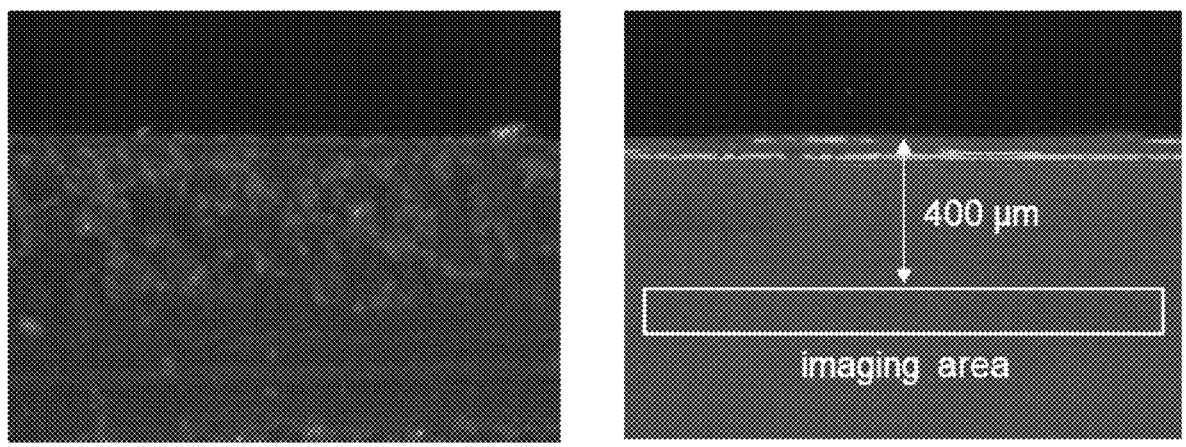
FIG. 10 is an image of a polydimethylsiloxane sample compared to the BIO-133-BP30 microsystem used for live-cell imaging according to an embodiments of the present invention, where the images were acquired in a backscattering format by placing the both polymers on a coverslip, the white box denotes the imaging area (400 µm above polymer edge), and illustrating that scattering centers are not observed in the case of BIO-133-BP30, while the observed (backscattered) fringes denote the high surface quality.

To inspect the surface quality of the microsystem's sidewall, the microsystem was positioned on top of a coverslip and imaged using a backscattering geometry (similar to the Fizeau interferometric principle) using broadband illumination (500 nm-700 nm), a 4× magnification objective and an sCMOS camera. This set-up enabled visualization of the interference fringes between the polymer and the glass coverslip and, thus, the indirect assessment of the surface quality. FIG. 10 is an image of a polydimethylsiloxane sample compared to the BIO-133-BP30 microsystem used for live-cell imaging according to an embodiments of the present invention, where the images were acquired in a backscattering format by placing the both polymers on a coverslip, the white box denotes the imaging area (400 µm above polymer edge), and illustrating that scattering centers are not observed in the case of BIO-133-BP30, while the observed (backscattered) fringes denote the high surface quality.

Figure 11:
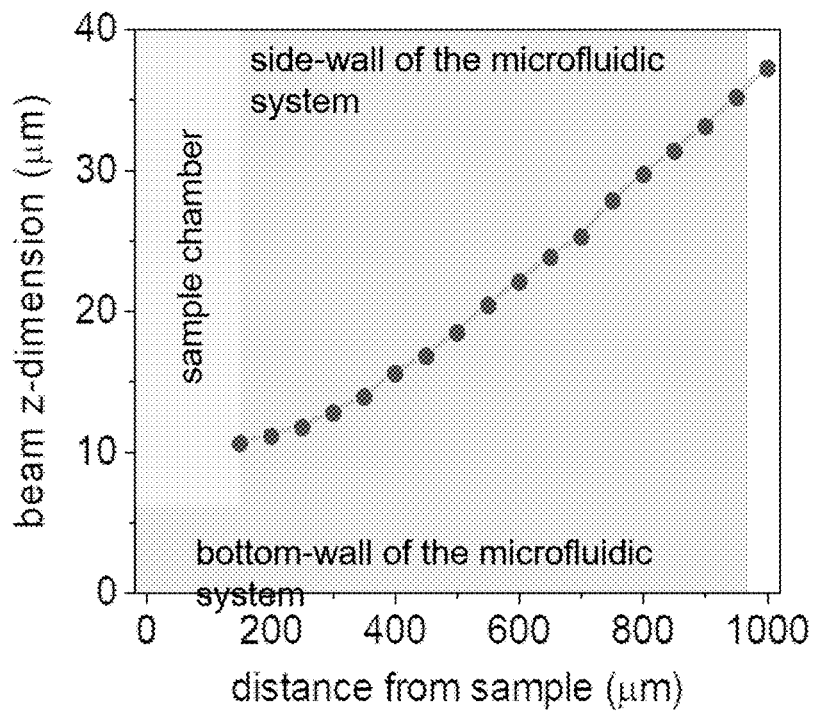
FIG. 11 illustrates the evolution of the Airy beam dimension along the z-axis as a function of its propagation distance (x-axis in FIGS. 1 and 2) measured by translating a CMOS camera positioned on the microscope stage with respect to the illumination objective, where the blue shaded area indicates the 800 µm thick microfluidic system side-wall, illustrating that the vertical dimension of an Airy beam used in one embodiment of the present invention is significantly less than the bottom polymer film of the microfluidic system (400 µm), thereby providing uninterrupted beam propagation until the sample is met.
Figure 12:
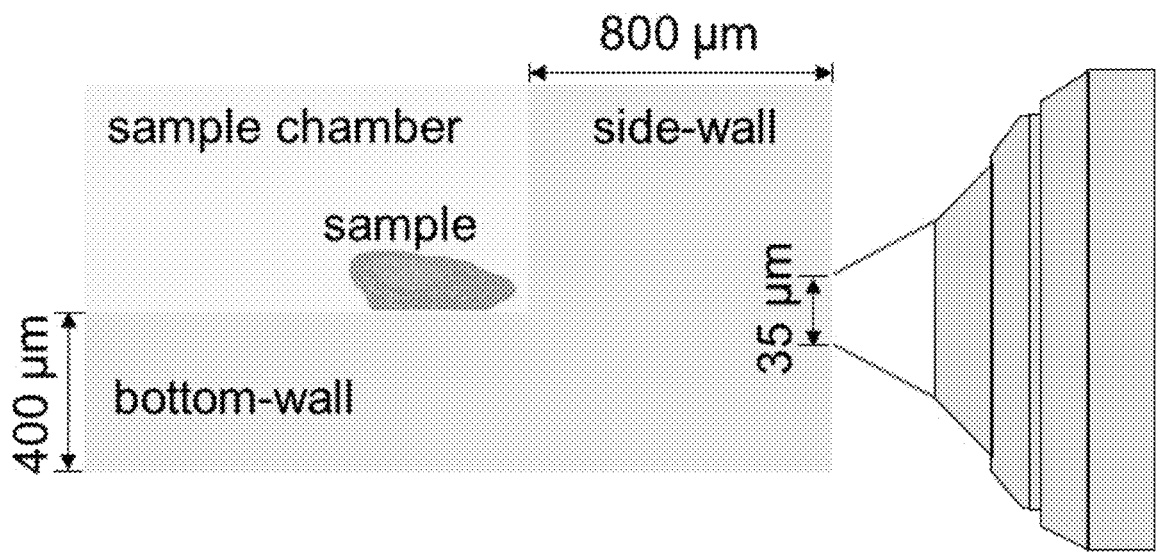
FIG. 12 illustrates the evolution of an Airy beam dimension along the z-axis (FIGS. 1 and 2) as a function of its propagation distance (x-axis in FIGS. 1 and 2) measured by translating a CMOS camera positioned on the microscope stage with respect to the illumination objective, where the blue shaded area indicates the 800 µm thick microfluidic system side-wall, illustrating that the vertical dimension of an Airy beam used in one embodiment of the present invention is significantly less than the bottom polymer film of the microfluidic system (400 µm), thereby providing uninterrupted beam propagation until the sample is met.

FIG. 11 illustrates the evolution of the Airy beam dimension along the z-axis as a function of its propagation distance (x-axis in FIGS. 1 and 2) measured by translating a CMOS camera positioned on the microscope stage with respect to the illumination objective, where the blue shaded area indicates the 800 µm thick microfluidic system side-wall, illustrating that the vertical dimension of an Airy beam used in one embodiment of the present invention is significantly less than the bottom polymer film of the microfluidic system (400 µm), thereby providing uninterrupted beam propagation until the sample is met. FIG. 12 illustrates the evolution of an Airy beam dimension along the z-axis (FIGS. 1 and 2) as a function of its propagation distance (x-axis in FIGS. 1 and 2) measured by translating a CMOS camera positioned on the microscope stage with respect to the illumination objective, where the blue shaded area indicates the 800 µm thick microfluidic system side-wall, illustrating that the vertical dimension of an Airy beam used in one embodiment of the present invention is significantly less than the bottom polymer film of the microfluidic system (400 µm), thereby providing uninterrupted beam propagation until the sample is met.

D. Data Acquisition and Processing

Micro-Manager 1.4 and CellVista Pro (Phi Optics) were used for fluorescent and quantitative-phase image acquisition. A PC (Z8, Hewlett-Packard) equipped with Intel Xeon W-2123 W CPU @ 3.60 GHz processors and 128 GB RAM acquired and temporarily stored raw 3D images. For longer term storage, all data was transferred to a server. Images were analyzed using ImageJ on a workstation equipped with an Intel Core i7-7820X CPU @ 3.60 GHz processor and 128 GB RAM. Image deconvolution was performed using the Richardson-Lucy algorithm in the DeconvolutionLab2 ImageJ plugin, using an experimentally determined point spread function (PSF) and a 3D stack of 0.2 µm diameter fluorescent particles. 3D image reconstruction was performed using the VolumeViewer plugin (ImageJ).

E. Optical Resolution and PSF Characterization

Figure 13:
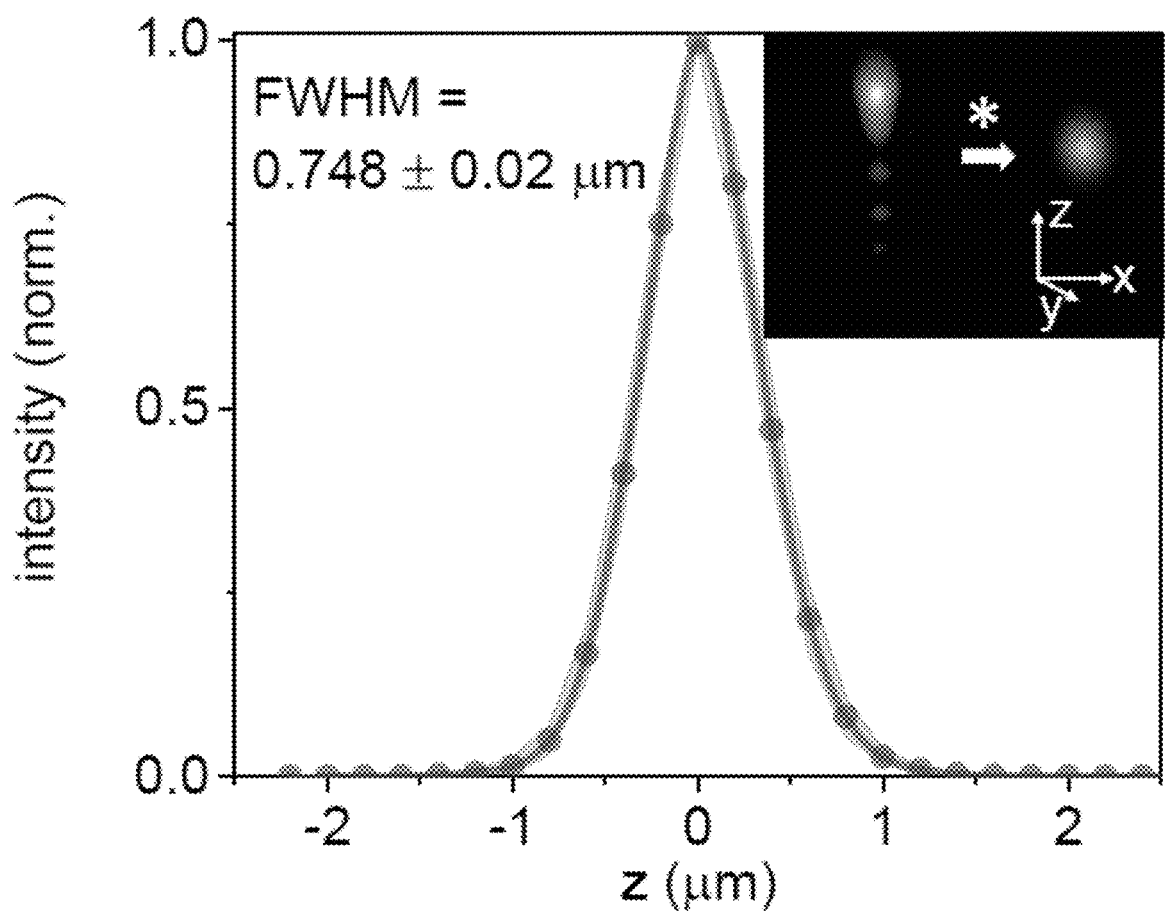
FIG. 13 illustrates the full-width half maximum (FWHM) along the z-axis of 25 fluorescent particles (500 nm in diameter) denoting the axial resolution, wherein the red data points depict the experimentally determined mean values, the blue shaded areas the 95% confidence intervals, and the inset plots the average (±s.e.) of the 25 observations.

FIG. 13 provides data characterizing the axial resolution of certain disclosed embodiments of an integrated optical system that was obtained using fluorescent particles embedded in an agarose gel. To prepare the gel sample, 1.5% agarose (Ultra-Pure, Invitrogen) was mixed with deionized water and the mixture was heated in a convection oven at 80° C. for 45 minutes until the agarose completely dissolved. Subsequently, fluorescent micro-spheres were added to the gel and mixed thoroughly. For optimal particle density, the particle solution of 1% solids was diluted by approximately 104. The mixture was then poured into a custom holder, positioned between two coverslips for 15 minutes and allowed to solidify prior to imaging. Specifically, 0.5 µm and 0.2 µm mean diameter particles (FSDG003 and FSDG004, Bangs Laboratories) were used to quantify the system's z-resolution and point spread function, respectively. For both measurements, a 100 µW excitation power was used after the illumination objective, a 525/50 bandpass filer (Chroma) and a 0.2 µm step size on the piezo stage. For quantifying the system's axial and planar resolution, n=25 observations was used. For determining the system's PSF, n=5 observations was used, and subsequently used the average PSF was used in the deconvolution algorithms. FIG. 12 establishes the axial resolution of certain disclosed embodiments of the present invention.

F. Propagation Length and Diffraction Quantification

Figure 14:
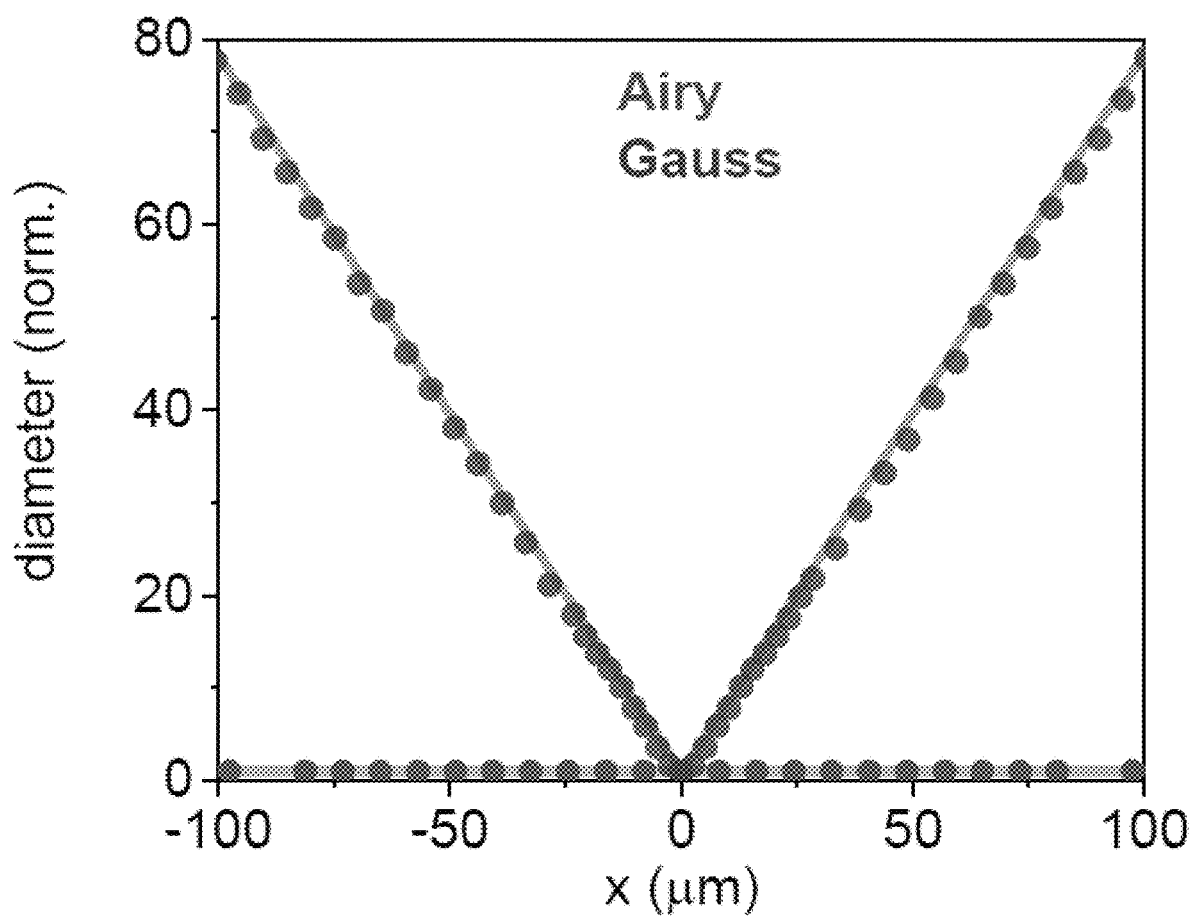
FIG. 14 provides experimental data of Airy and Gaussian beam propagation and diffraction in a uniformly fluorescent sample, wherein the dots illustrate the experimental data, the solid lines the simulation results of the approximated beam diameter, and wherein the y-axis is normalized to the minimum value of each beam.

FIG. 14 provides data concerning an experimentally determined diffraction-free propagation length of Airy and Gaussian beams. This data was obtained by illuminating a homogeneously fluorescent sample and quantifying the beam diameter (approximated by 1/e) through the lateral intensity distribution (along the y-axis in FIGS. 1 and 2) at various propagation distances (along the x-axis in FIGS. 1 and 2). The fluorescent sample was prepared in a polydimethylsiloxane (PDMS Sylgard 184, Dow Corning) matrix mixed with the chromophore Lumogen orange (BASF). To this end, the PDMS monomer was first mixed and degassed with its catalyst (10:1 ratio), and subsequently 10 µL of a Lumogen Orange dichloromethane (HPLC LC-MS grade, OmniSolv) solution at 0.1 mg/ml was added. The mixture was cured for 2 hours at 70° C. prior to imaging. The experimental results of the Airy beam propagation shown in FIG. 11 were co-plotted with the FFT-BPM computational results, and the Gaussian results with an analytical expression for the Gaussian beam waist (w) as a function of the propagation distance z, $$w(z) = w_0 \sqrt{1 + \left(\frac{z}{z_r}\right)^2},$$

with $w_o$ set at 1.2 µm.

G. Strain and Growth Conditions

*Yarrowia lipolytica* was used to exemplify using the disclosed integrated imaging assembly to image a living organism. The *Y. lipolytica* strain used for this study was generated on an auxotrophic background with decreased non-homologous end joining for targeted DNA incorporation. See, Bredeweg, E. L., et al., A molecular genetic toolbox for *Yarrowia lipolytica*. Biotechnology for Biofuels, 2017. 10(1): p. 2. The strain was modified using a superfolder GFP plasmid to endogenously express fluorescent erg6, an enzyme in the ergosterol biosynthesis pathway. For the rich YPD medium, 20 g/L Bacto Peptone (BD), 10 g/L yeast extract (Alfa Aesar), and 20 g/L glucose (Fisher) were mixed together. The defined YSM medium at a C:N ratio of 150 contained 1.7 g/L yeast nitrogen base without amino acids and without ammonium sulfate (BD Difco), 0.69 g/L complete supplement mixture (CSM) without Leucine (Sunrise Science Products), and 1.1 g/L ammonium sulfate (Fisher) and 75 g/L glucose (Fisher). The erg6 expressing *Y. lipolytica* preculture was stored in YPD agarose (Invitrogen) plates at 4° C. and passed twice in YPD medium (5 ml round bottom polystyrene tubes) for 24 hours, with the second passage performed at a 50× dilution. Subsequently, the YPD culture was centrifuged at 490×g, washed in YSM three times, and transferred to 125 ml glass flasks (Corning) containing 20 ml of YSM medium. The flasks were covered with polypropylene closures (Corning) and aluminum foil. The transfer from YPD (rich medium) to YSM (defined medium) was performed at a 0.01 dilution. All growth experiments were performed in a shaking incubator at 28° C. To perform integrated QPI and Airy LSI imaging, the growing *Y. lipolytica* culture was diluted 25 times. Approximately 10 μL of the diluted culture were transferred to a microfluidic system, and cells were allowed to sediment to the bottom surface. Under these conditions, no 3D motion or drift was observed for the cells during image acquisition. The cells were imaged at 48 hours and 96 hours, corresponding to high and low triacylglyceride content states.

H. Cell Imaging

Select areas were first imaged by QPI and subsequently by the Airy beam at 488 nm. Stacks of 200 planes were acquired at a 0.2 μm step size. Single-cells were localized via maximum projection of the QPI image, and segmented to localize the cell and LD contours via direct phase-thresholding at different levels in ImageJ. Using the cell's 2D segmented region of interest (ROI), cell area and the average optical phase ($<\Phi>$) and subsequently the cell dry-density at a wavelength of $\lambda=500$ nm and a refractive index increment (dn/dc) of $1.85 \cdot 10^{-4}$ m$^3$ kg$^{-1}$ were calculated using the following equation:

$$\rho = \frac{\lambda}{2 \cdot \pi \cdot \frac{dn}{dc}} <\Phi> \quad (3)$$

The expression levels of erg6 per cell contour were quantified by subtracting the cell's average fluorescent intensity from the extracellular background. The % coverage of the 3D LD surface by erg6 was quantified by counting the erg6 fluorescence voxels (i.e., 3D pixels with a total volume of $2\times10^{-3}$ μm$^3$) that were in contact with the LD, the 3D location of which was estimated from the LD diameter.

I. Discussion

As disclosed herein, exemplary embodiments of an integrated imaging system combined spatial light interference microscopy (SLIM) for QPI with an Airy beam light-sheet for 3D fluorescent imaging on to a standard inverted microscope (FIGS. 1 and 2). Specifically, SLIM operates by illuminating a sample in a Koehler configuration through a high numerical aperture condenser (e.g. NA 0.55, 2.8 cm working distance) and guiding the sample transmission via an objective (e.g. 63×/0.7) onto a spatial light modulator (FIGS. 1 and 2). The latter is positioned at a conjugate image plane from a standard camera port and applies additional phase-delays to the non-diffracted wavefront (background) with respect to the diffracted wavefront. At this configuration, SLIM reconstructs quantitative-phase images of approximately 200×200 μm$^2$ areas and planar resolution of 0.641±0.006 μm (mean±standard error, n=25 beads with a 500 nm diameter). SLIM's sensitivity and resolution has been shown to effectively quantify the growth kinetics of single *Escherichia coli* and mammalian cells and nutrient allocation to growth and lipid accumulation in single yeast cells.

To integrate QPI with LSI of identical imaging areas and inspired by previous demonstrations, a self-accelerating Airy beam was used for fluorescent light-sheet excitation. The set-up for generating the Airy beam discussed above comprised a second spatial light modulator that exhibited an appropriate cubic phase mask. This mask was imaged to the back focal plane of an illumination objective (20×/0.42) with a ~0.8× overall magnification. The illumination objective was positioned orthogonally to the detection objective (FIGS. 1 and 2), with the latter being the same (63×/0.7) for both QPI and Airy-LSI.

An Airy beam with a cubic phase mask exhibiting a $\alpha=5.38$ mm-3 scaling parameter was adopted, thus, varying from $-84\pi$ to $+84\pi$ over a 10 mm range. This phase mask provided an Airy beam having a diffraction-free path (along the x-axis in FIGS. 1 and 2) that was comparable to the dimensions of the SLIM image. Denser phase modulation further increased the diffraction-free path; however, this approach also positioned the side-lobes of the vertical structure of the Airy beam farther from each other, hindering the utility of high NA objectives.

Figure 16:
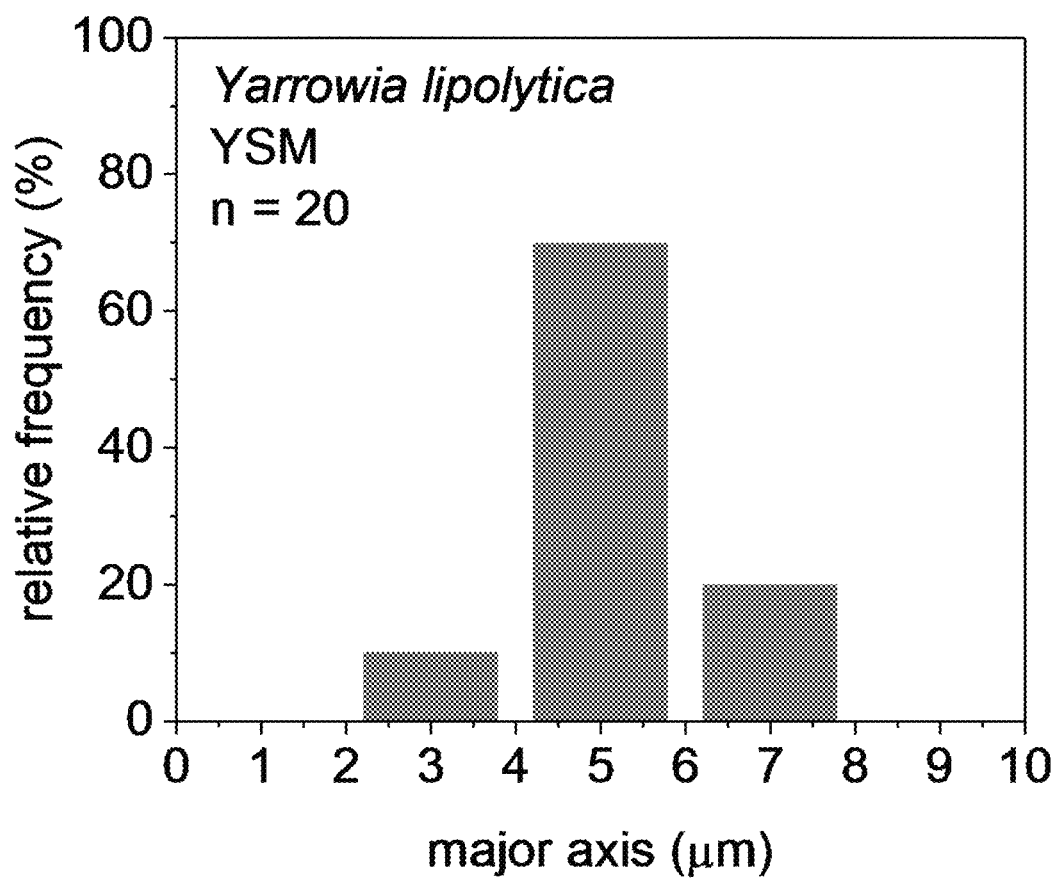
FIG. 16 is a graph of relative frequency versus major axis (µm) illustrating the results of a representative, live-cell multivariate imaging investigation provided by an imaging system according to the present invention using a microfluidic sample receiver for receiving an oleaginous yeast *Yarrowia lipolytica*.
Figure 17:
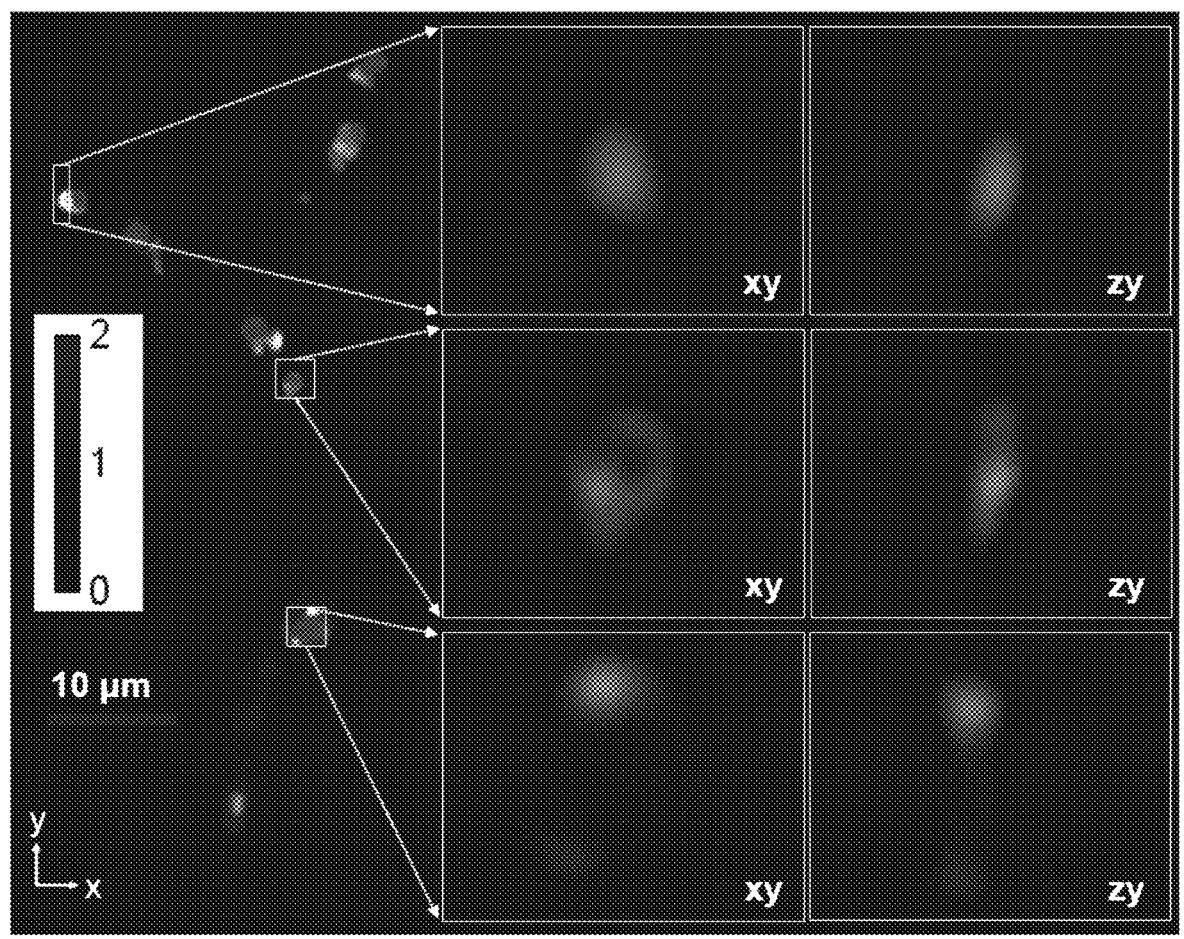
FIG. 17 provides the maximum projection (xy plane) of a *Y. lipolytica* Airy-QPI integrated image, wherein blue denotes the QPI image (scale bar in radians), red localizes the lipid droplets (LDs) (phase-thresholded masks), white denotes the GFP-erg6 fluorescence, and wherein select magnified areas of erg6 are displayed on the right side in the xy and yz planes with each box size being ~5×5×5 µm³.
Figure 18:
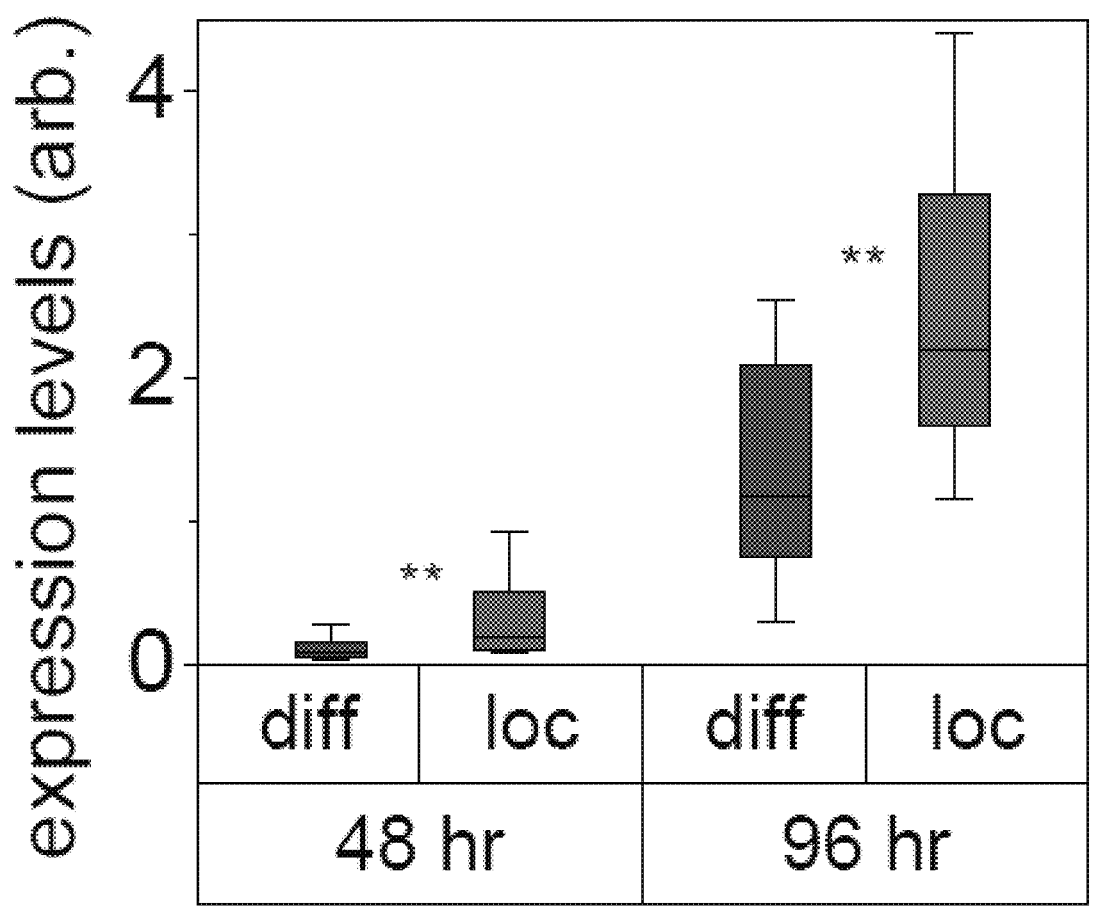
FIG. 18 provides box-plots comparing the erg6 expression levels for localized (blue) and diffusive (red) states at two different time points: 48 hours (n=61) and 96 hours (n=55); box-plots represent the 25th and 75th percentiles and whiskers the 10th and 90th percentile; asterisks denote statistically significant differences between distributions (Mann-Whitney Test, U=100, p=0.01 for 48 hours and U=150.5, p=0.001 for 96 hours).

Importantly, disclosed integrated imaging systems implemented a long working distance (20 mm) illumination objective and a custom-made 3D microscope stage. The long working distance objective enabled fluorescent excitation without obstructing QPI's Koehler illumination. The custom stage 100, illustrated by FIG. 4, was equipped with a piezo-electric module to vertically scan the sample with respect to the plane of illumination to enable 3D image reconstruction. Stage 100 was also open-ended on one side (FIG. 4), enabling complete optical access to the side-plane (yz plane in FIGS. 1 and 2) of the sample. Optical access was further facilitated by tailored microfluidic systems. These microsystems were fabricated in a polymer that was transparent, index-matched to water and of low side-wall surface roughness using a combination of UV and soft-lithography (FIGS. 16-18). Index matching to water essentially rendered the microfluidics invisible to the fluorescent excitation, thus, eliminating optical aberrations at the polymer-water interface. The bottom wall of the microsystem (xy plane in FIGS. 1 and 2) and its side wall (yz plane in FIGS. 1 and 2) were 400 μm and 800 μm thick, respectively. These dimensions enabled imaging cells at the bottom surface of the microsystem without any distortion to the Airy beam. This is because the vertical dimension of the Airy beam (z-axis in FIGS. 1 and 2) was significantly smaller than the thickness of the bottom wall of the microfluidic system. In turn, this enabled optical access to the sample without the illumination beam crossing the refractive index boundary at the air-polymer interface at the bottom wall of the microsystem. This finding is supported by the experimental results presented by FIGS. 19 and 20.

J. Performance

The propagation invariant intensity property of the Airy beam enabled a diffraction-free path (x-axis in FIGS. 1 and 2) of approximately 200 as visualized in a uniformly fluorescent polymer at a wavelength of 488 nm (FIG. 14). This value was considerably larger than the respective path of a Gaussian beam at the same wavelength, which increased linearly in diameter by almost two orders of magnitude for the same propagation distance (FIG. 14). To form a 2D image, the Airy beam was scanned with a MEMS mirror over a 200 µm range (y-axis in FIGS. 1 and 2). As such, a 200×200 µm² imaging area was obtained for LSI that matched exactly that of QPI's. This imaging area surpasses previous demonstrations utilizing optical lattice configurations (0.37 µm axial resolution) and propagation invariant Bessel beams in an epi-illumination SPIM format (0.44 µm axial resolution by not considering the side-lobes), and smaller (~0.6×) than previous Airy beam demonstrations (0.86 µm axial resolution). For comparison, the field-of-view using a Gaussian illumination beam in disclosed embodiments was approximately 200×10 µm².

IV. Imaging

Single-cell biology has led to a plethora of unexpected discoveries, primarily catalyzed by advances in optical imaging, as well as sequencing and metabolomics. In the context of optical imaging, the advent of SPIM, LSI and LLSI has greatly advanced the ability to probe dynamic and structural cellular phenotypes at unprecedented imaging speeds and phototoxicity levels. QPI provides low phototoxicity, which additionally provides information concerning the location, size and dry-density of cells and their organelles. Importantly, dry-density offers insight that is enthalpically more pertinent to cellular physiology and metabolism than what is possible by volumetric bioimaging, including LSI.

Disclosed embodiments have fused two imaging modalities on to a standard inverted microscope. Certain exemplary embodiments used a self-accelerating Airy beam illumination pattern. These exemplary integrated systems exhibited identical fields-of-view in each modality without any disruptions to their respective optical paths. Importantly, this design is compatible with microfluidics that alleviate some of the stringent culture and sample preparation techniques required by common LSI and LLSI configurations. Further, the described integrated design is compatible with most QPI methods, including holographic tomography and appropriate methods for thick and multiply scattering samples, open-source software, and alternative microscope frames.

As a representative example, an exemplary integrated imaging system was used to image *Y. lipolytica*, which is challenging to image due to its small dimensions. In this context, the imaging system revealed that clonal cells can exhibit two distinct forms of spatial heterogeneity. Specifically, enzymes were observed participating in ergosterol biosynthesis localized heterogeneously both in the cytosolic milieu and around the LDs. Further, when localized, erg6 decorates heterogeneously the LDs. These two forms of spatial heterogeneity suggest that ergosterol biosynthesis is likely also spatially heterogeneous. Such forms of heterogeneity not only indicate that LD recognition solely from the GFP signal of erg6 can be limiting, but also that cellular noise affecting the levels of erg6 expression may also impact the compartmental localization of metabolic reactions. This observation raises further questions about the underlying metabolic costs, efficiencies, and evolutionary consequences of metabolic compartmentalization.

Thus, this exemplary live-cell imaging experiment represented one example of how the present integrated imaging system can be applied to single-cell biology investigations, namely: the application of QPI to provide information concerning organelle location in a label-free fashion and cell metabolism via the enthalpically relevant metric of dry-density, and Airy LSI to provide information concerning 3D protein dynamics.

V. Examples

The following examples are provided to illustrate certain features of exemplary embodiments of the present invention. A person of ordinary skill in the art will appreciate that the scope of the present invention is not limited to the features of these illustrative examples.

Example 1

Figure 15:
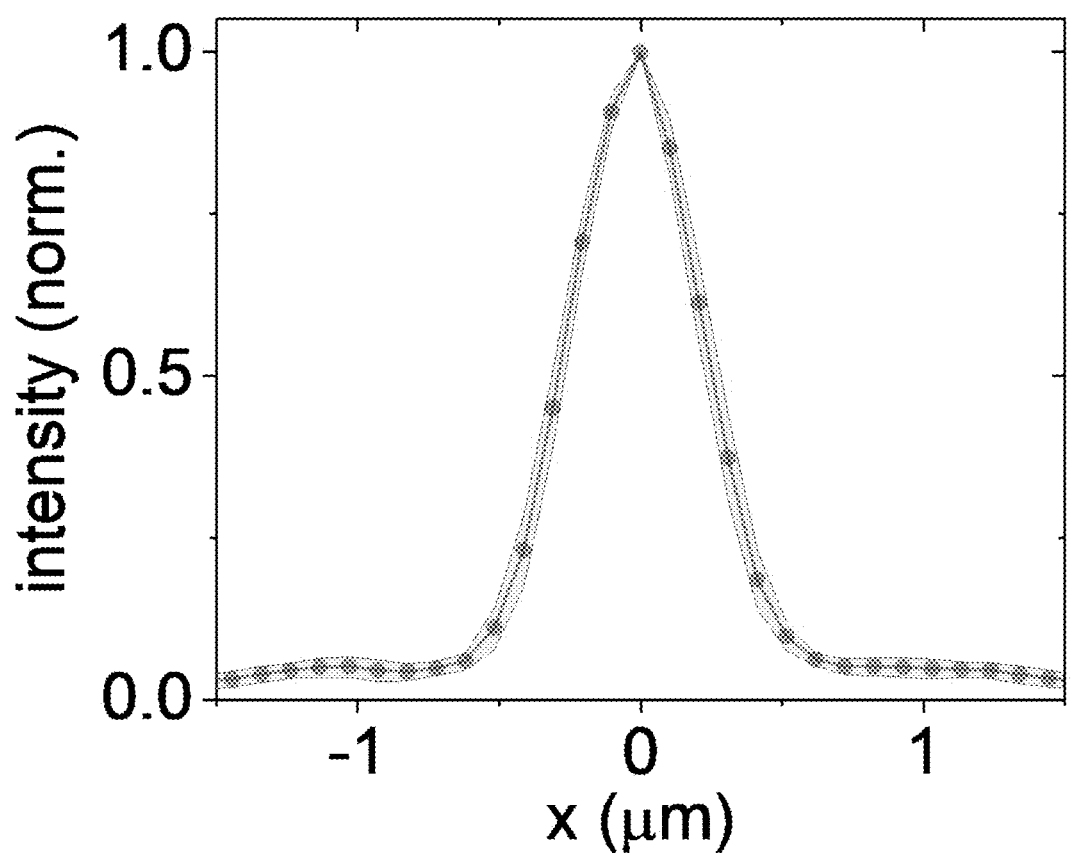
FIG. 15 is a graph of intensity versus X (µm) illustrating planar resolution of one embodiment of an imaging system according to the present invention as determined using 200 nm diameter beads at 0.523±0.021 µm, mean±standard error, n=25.

This example illustrates the resolving power of the Airy LS system of FIG. 3 along the z-axis. 500 nm diameter fluorescent particles embedded in a non-scattering matrix were used for this example. The full-width-at-half-maximum (FWHM) along the z-axis was 0.748±0.020 µm (mean±standard error, n=25, FIG. 13). This value was obtained after deconvolution to remove the transverse structure of the Airy beam, using an experimentally determined 3D point-spread-function and the Richardson-Lucy algorithm. This value is slightly higher than the system's planar resolution (determined using 200 nm diameter beads at 0.523±0.021 µm, mean±standard error, n=25, FIG. 15), enabling quasi-isotropic 3D imaging. Further, the determined lateral resolution was moderately lower than previous reports using an Airy beam light-sheet [Vettenburg, T., et al., Light-sheet microscopy using an Airy beam. Nature Methods, 2014. 11(5): p. 541-544.]. This improvement is attributed to the implementation of a higher NA detection objective that enabled the collection of the main Airy lobe as well as 3 side lobes (FIG. 13, inset). Importantly, the axial resolution was more than half of the diameter of the main lobe of the Airy beam. This suggests that, in agreement with previous demonstrations [Vettenburg, T, supra], the transverse structure of the Airy beam is accounted for by deconvolution and contributes positively to the imaging process.

Example 2

This example demonstrate the applicability of the reported integrated system for multivariate bioimaging. A representative live-cell, multivariate imaging investigation in microfluidics was performed using the oleaginous yeast *Yarrowia lipolytica*. This model system was selected for two reasons. First, *Y. lipolytica* cells exhibit overall dimensions (ellipsoidal volume with typically a 5.3±0.4 µm major axis, mean±standard error, FIG. 16) that are challenging for LSI. Second, *Y. lipolytica* represents an important tractable model system for the production of 2nd generation biofuels. In this context, *Y. lipolytica* has been shown to accumulate increased amounts of triacylglycerides, a biodiesel precursor, within a cytosolic organelle termed the lipid droplet (LD). In addition to biotechnology applications, LDs are also central in cellular metabolism and energy homeostasis, disease, as well as protein, chromatin component and transcription factor trafficking.

For imaging, a demonstrative subpopulation of a *Y. lipolytica* culture expressing a GFP-tagged ergosterol 6 enzyme (erg6, YALI0F08701g) growing in batch was collected. Cells were collected at 48 hours and 96 hours, two timepoints that correspond to low and high lipid content, respectively. The cells were subsequently introduced into a microfluidic system and allowed to sediment to the bottom surface. Critically, QPI enabled the segmentation of single-cells without any dedicated computational approaches or staining procedures, but rather taking advantage of the cells' higher optical-phase delay than the background. Similarly, the LDs of individual cells were segmented in QPI by relying on their higher optical phase-delay than the cell cytosol (FIG. 13), without any further staining. Within each segmented cell, the 3D distribution of fluorescent erg6 enzymes was quantified using the Airy LSI at a 488 nm excitation wavelength (FIG. 17).

A comparison between the erg6 distribution with the LD location unmasked two unexpected forms of spatial heterogeneity. In the first, erg6 either localized in the vicinity of LDs or displayed diffusive behavior (FIG. 17). Diffusive specifically refers to states where erg6 does not localize in the vicinity of an LD, but likely to the endoplasmic reticulum as previously suggested. Further quantitative analysis revealed that the heterogeneous occupancy of diffusive and localized states occurred both at the early and late stage of lipogenesis, characterized by a statistically significant dependence on the erg6 expression levels (FIG. 18). Specifically, cells with overall higher erg6 expression levels were more likely to exhibit localized erg6 in the vicinity of an LD.

Figure 19:
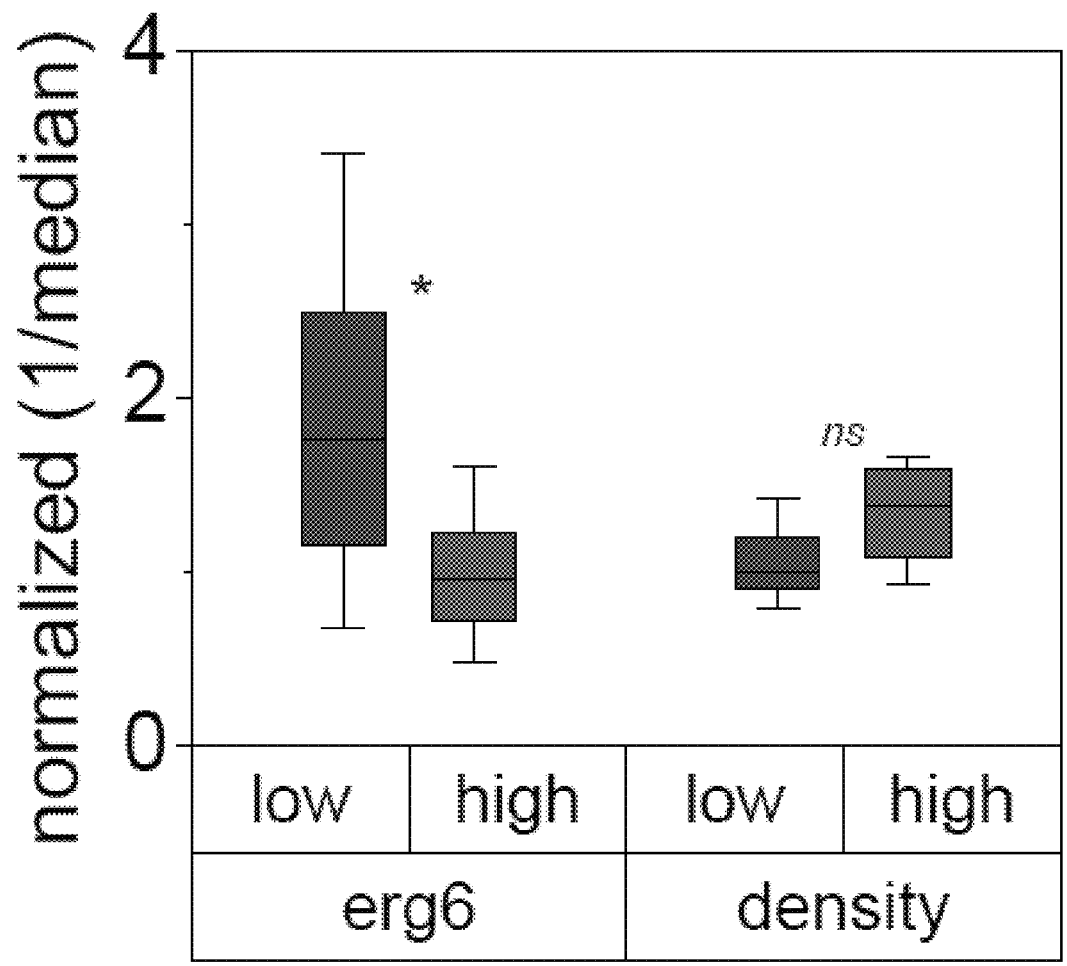
FIG. 19 provides box-plots similar to the FIG. 18 box-plots comparing the erg6 expression levels and dry-density for cells exhibiting low (less than 10%) and high (greater than 10%) coverage of the LD surface area by erg6 cluster; the y-axis is normalized with respect to the expression and density median values of the population, while asterisks denote statistically significant differences between distributions (Mann-Whitney Test, U=64, p=0.03 for eg6 expression and U=18, p=0.07 for cellular dry-density).

The second form of spatial heterogeneity pertained particularly to erg6 localized states. Focusing on the 96 hours timepoint, enzymes did not uniformly decorate the 3D surface of LDs, but rather exhibited clusters that offered only partial coverage (FIG. 17). Using the 3D resolving capability of the Airy LSI, the percentage of the LD surface area that was in contact with erg6 was quantified. In this context, the low relative contact areas exhibited increased erg6 expression levels, while conversely, high contact areas exhibited lower expression levels of erg6 (FIG. 19). In other words, cells with overall increased erg6 expression levels were statistically more likely to exhibit reduced contact areas between LDs and erg6 (FIG. 19). Interestingly, similar statistical evidence between the cellular dry-density (determined by the cell's optical phase, see Methods) and LD coverage was not found (FIG. 19). The latter indicates that cells stochastically overproducing biomass building blocks (e.g., proteins, ribosomes, DNA, lipids) do not regulate specifically the contact area between erg6 and LDs, and possibly the spatial heterogeneity of erg6 biosynthesis. Critically, the increased cellular density did not correlate with erg6 expression levels, suggesting that increased production of biomass does not gratuitously lead to erg6 overexpression.

Example 3

Figure 20:
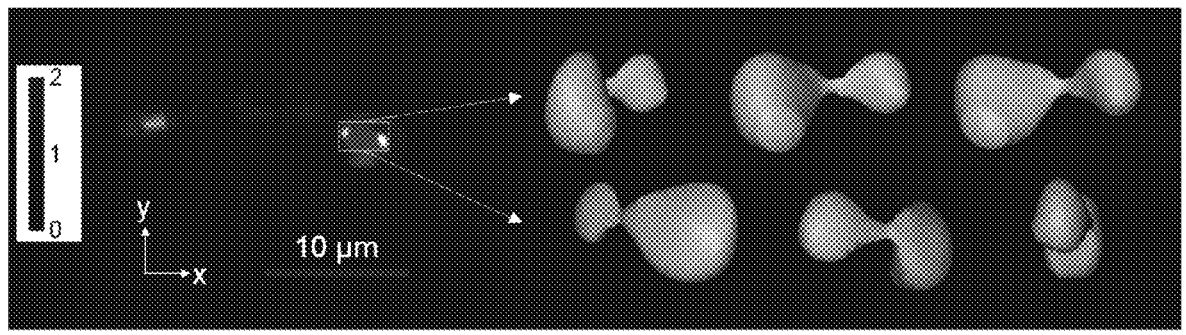
FIG. 20 provides *Y. lipolytica* imaged by QPI and Airy LSI, where the QPI image is displayed in blue (scale bar in radians), red localizes the LD mask determined by QPI, white denotes the maximum projection of the GFP-erg6 fluorescence, and where select areas of erg6 are presented at the right side of the figure digitally magnified and displayed in different orientations.
Figure 21:
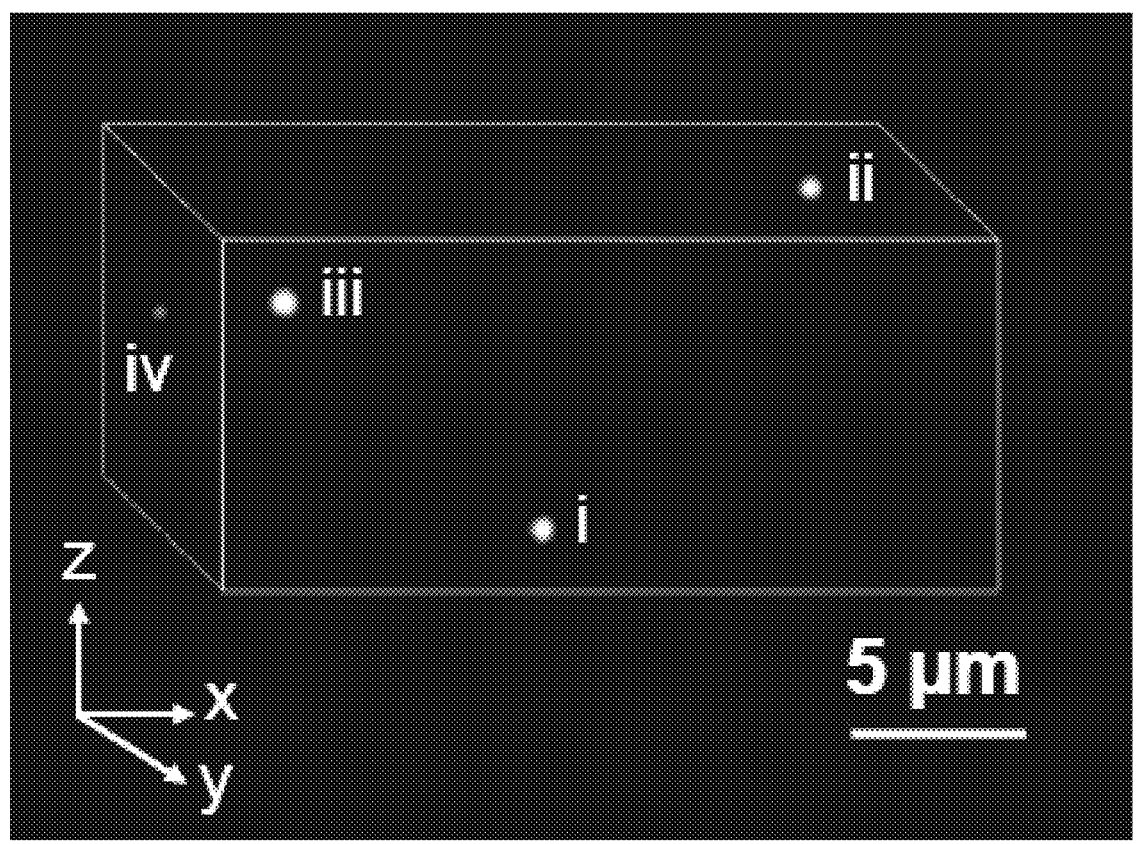
FIG. 21 is a representative 3D fluorescent image of 500 nm diameter particles imaged using Airy beam illumination after deconvolution.
Figure 22:
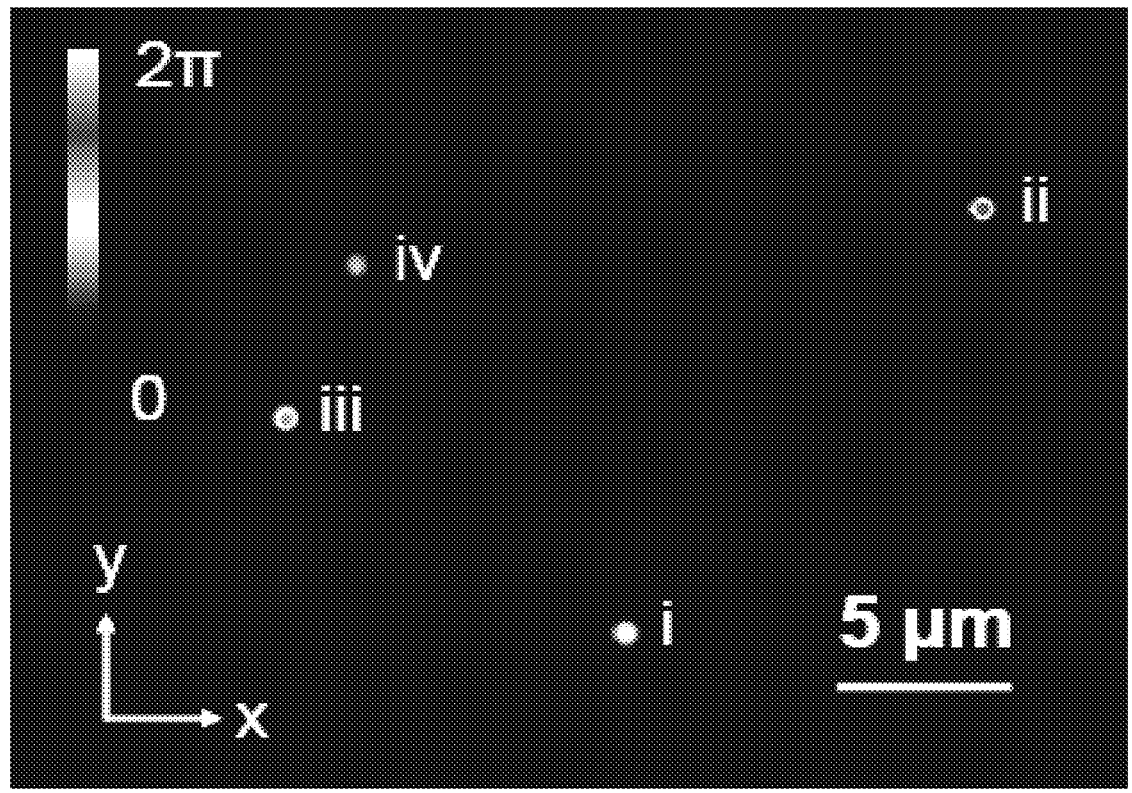
FIG. 22 is an image of the same particles of FIG. 21 displayed by QPI, wherein the inset depicts the scale bar in radians.
Figure 23:
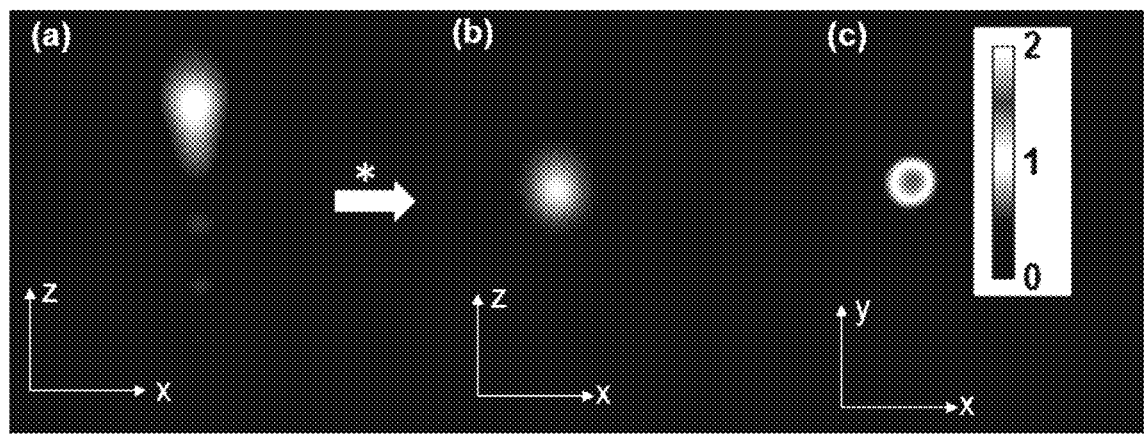
FIG. 23 provides representative 3D fluorescent images of a 500 nm diameter particle (a) before, and (b) after deconvolution, and (c) the same particle displayed by QPI.

This example further demonstrates the applicability of the reported integrated system for multivariate bioimaging using the oleaginous yeast *Yarrowia lipolytica*. A *Y. lipolytica* strain expressing a GFP-tagged Sterol 24-C-methyltransferase enzyme was used for this example by introducing late stationary phase cells to a polymer microfluidic system. Specific growth conditions were selected that maximized the cellular triacylglyceride (TAG) content. Further, to minimize aberrations, the polymer microsystem was fabricated by standard cast-molding and UV lithography in a polymer that was index-matched to water with appropriate dimensions that did not distort the Airy beam during propagation. QPI was employed for cell segmentation, localization of cytosolic lipids (in the form of lipid droplets—LDs), and quantification of cell size and mass, while the Airy LSI enabled 3D localization of the erg6 enzymes (FIG. 20). Importantly, this example demonstrates the strength and modularity of the integrated QPI and LSI imaging. Specifically, QPI frees spectral channels that would otherwise be occupied by fluorescent markers that target specific organelles (LDs in this case). This approach improves the wavelength-multiplexing of existing probes, but also potentially improves precision since fluorescent probes can display binding bistability between organelles, as previously reported for Glycerol-3-phosphate acyltransferase 4 (GPAT4). Further, Airy-LSI uncovers the 3D distribution of erg6 in the vicinity of an LD, which would otherwise be masked by conventional epifluorescence microscopy. Overall, this multivariate imaging approach elicits previously masked impacts of cellular noise on the compartmentalization of metabolic reactions.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An integrated imaging system, comprising an integrated quantitative-phase imaging system and a light-sheet imaging system, wherein the imaging system is configured to combine spatial light interference microscopy for quantitative-phase imaging with an Airy beam light-sheet for 3D fluorescent imaging on to a standard inverted microscope.

2. The integrated imaging system according to claim 1, comprising:
   a first detection objective for quantitative-phase imaging;
   a second objective for guiding light-sheet illumination, wherein the first and second objectives are configured so that illumination and detection are arranged orthogonally; and
   a device for viewing, generating and/or capturing an image.

3. The integrated imaging system according to claim 2, wherein the second objective for guiding light-sheet illumination includes a diffraction-free beam, wherein the diffraction-free beam is an Airy beam, a Bessel beam, an optical lattice or a Gaussian beam.

4. The integrated imaging system according to claim 3 wherein the Airy beam, Bessel beam, optical lattice, or Gaussian beam are generated by a spatial light modulator or a diffractive optical element.

5. The integrated imaging system according to claim 1 comprising an Airy beam generated by a spatial light modulator and configured to scan a sample in a selected direction.

6. The integrated imaging system according to claim 1 wherein transmission is encoded by a spatial light modulator to reconstruct an optical-phase image.

7. The integrated imaging system according to claim 1 further comprising a reflecting dichroic filter to direct a fluorescent signal to a first camera and transmitted white light to a spatial light modulator and a second camera.

8. The integrated imaging system according to claim 1 further comprising a microfluidic system for housing a sample, wherein the microfluidic system is manufactured using a material or materials having a refractive index or indices substantially matching the refractive index of a sample medium.

9. The integrated imaging system according to claim 8 wherein the sample medium is aqueous.

10. The integrated imaging system according to claim 8 wherein the sample comprises cells and/or tissue, and the material has a refractive index of about 1.3.

11. The integrated imaging system according to claim 8 wherein the material is a polymer selected from a MY POLYMER material, agarose, polyacrylamide, or combinations thereof.

12. The integrated imaging system according to claim 1 configured to include objectives having different levels of magnification from 1× to 100×.

13. The integrated imaging system according to claim 1 comprising a spatial light modulator to encode transmission to reconstruct an optical-phase image.

14. The integrated imaging system according to claim 2 wherein the device for viewing, generating and/or capturing an image is a camera.

15. The integrated imaging system according to claim 1, comprising:
a first detection objective for quantitative-phase imaging;
a second objective for guiding an Airy beam generated by a first spatial light modulator to a sample enclosed in a microfluidic system, wherein the first and second objectives are arranged orthogonally;
a condenser to guide white illumination to the sample;
a second spatial light modulator to encode transmission to reconstruct an optical-phase image; and
a reflecting dichroic filter to direct a fluorescent signal to a first camera and transmitted white light to the second spatial light modulator and a second camera.

16. The integrated imaging system according to claim 2 comprising a microscope that provides the detection objective, the microscope coupled to a microscope stage configured to position a sample for scanning in 3 directions.

17. The integrated imaging system according to claim 16 wherein the microscope stage includes a piezo stage integrated with two linear stages.

18. The integrated imaging system according to claim 17 further comprising a MEMS mirror for directing an illumination beam to the sample, wherein the piezo stage, linear stages and MEMS mirror are synchronized using a controller to provide 3-dimensional imaging by scanning vertically using the piezo stage and scanning an illumination beam planarly using the MEMS mirror.

19. An imaging system, comprising:
a first detection objective to provide QPI and having different selectable levels of magnification from 1× to 100×;
a second objective having different levels of magnification from 1× to 100× for guiding an Airy beam, Bessel beam, optical lattice, or gaussian beam generated by a first spatial light modulator (SLM) for illuminating a sample housed in a microfluidic sample receiver with an illumination beam, the sample receiver comprising a material or materials having a refractive index or indices substantially matching the refractive index of a sample or sample medium, wherein the first and second objectives are configured so that illumination and detection are arranged orthogonally;
a condenser to guide white illumination to the sample;
a light conduit arranged parallel to the detection objective;
a second SLM to reconstruct an optical-phase image;
a reflecting dichroic filter to direct a fluorescent signal to a first sCMOS1 and transmitted white light to the second SLM and a second sCMOS2; and
a device for viewing, generating and/or capturing an image or images produced by the system.

20. The imaging system according to claim 19 wherein the detection objective is provided by a microscope coupled to a microscope stage configured to position a sample for scanning in 3 directions, wherein the microscope stage includes a piezo stage integrated with two linear stages, the system further comprising a MEMS mirror for guiding the illumination beam to the sample, wherein the piezo stage, linear stages and MEMS mirror are synchronized using a controller to provide 3-dimensional imaging.

21. A method, comprising:
providing an imaging system according to claim 1; and using the system.

22. The method according to claim 21, comprising using the system for imaging a biological system.

23. The method according to claim 22, comprising imaging a cell, imaging an organelle, imaging an organ, or imaging an organism.

24. The method according to claim 23 comprising imaging a live cell sample.

25. The method according to claim 24 wherein QPI provides label-free information concerning location, size and dry-density of cells and organelles and Airy LSI provides information concerning 3D protein dynamics.

26. The method according to claim 23 comprising imaging a single cell.

27. The method according to claim 21, comprising imaging a chemical reaction medium or constituents thereof.

* * * * *